United States Patent
Galloway et al.

(12)

(10) Patent No.: US 6,713,012 B2
(45) Date of Patent: Mar. 30, 2004

(54) AUTOMATED PROCESS AND APPARATUS FOR FORMING A MOLDED ARTICLE

(75) Inventors: Eugene V. Galloway, Anderson, SC (US); Barry N. Garrett, Easley, SC (US); James W. Montjoy, Anderson, SC (US); Michael F. Sale, Titusville, PA (US); Kevin W. Terrell, Easley, SC (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 409 days.

(21) Appl. No.: 09/785,748

(22) Filed: Feb. 17, 2001

(65) Prior Publication Data

US 2002/0093125 A1 Jul. 18, 2002

Related U.S. Application Data

(60) Provisional application No. 60/261,924, filed on Jan. 16, 2001, and provisional application No. 60/266,742, filed on Feb. 6, 2001.

(51) Int. Cl.[7] .................................................. B27N 5/02
(52) U.S. Cl. ........................................ 264/517; 425/80.1
(58) Field of Search ........................... 264/517; 425/80.1

(56) References Cited

U.S. PATENT DOCUMENTS 5,041,260 A * 8/1991 Johnson et al. ............. 264/510
5,688,467 A   11/1997 Kelman et al.
5,935,509 A   8/1999 Elliott
6,153,144 A * 11/2000 Byma ......................... 264/511

FOREIGN PATENT DOCUMENTS

FR          1 543 420 A      10/1968

* cited by examiner

Primary Examiner—Mary Lynn Theisen
(74) Attorney, Agent, or Firm—Inger H. Eckert; Maria C. Gasaway

(57) ABSTRACT

An automated assist apparatus is provided in a system for forming a molded article from a composition comprised of a plurality of chopped mineral fibers and a binder applied to at least one portion of a perforated mold and initially held in place by a vacuum drawn through the perforations before undergoing a curing process. The assist apparatus includes at least one device for holding the composition applied to at least one portion of the perforated mold in place prior to and during the curing process and a motive device for automatically moving the holding device from a first retracted position away from the mold to a second position for holding the composition in place. The vacuum is released when the holding device is in the second position. The composition undergoes curing and the holding device is automatically moved to the first retracted position for removing the cured molded article.

27 Claims, 22 Drawing Sheets

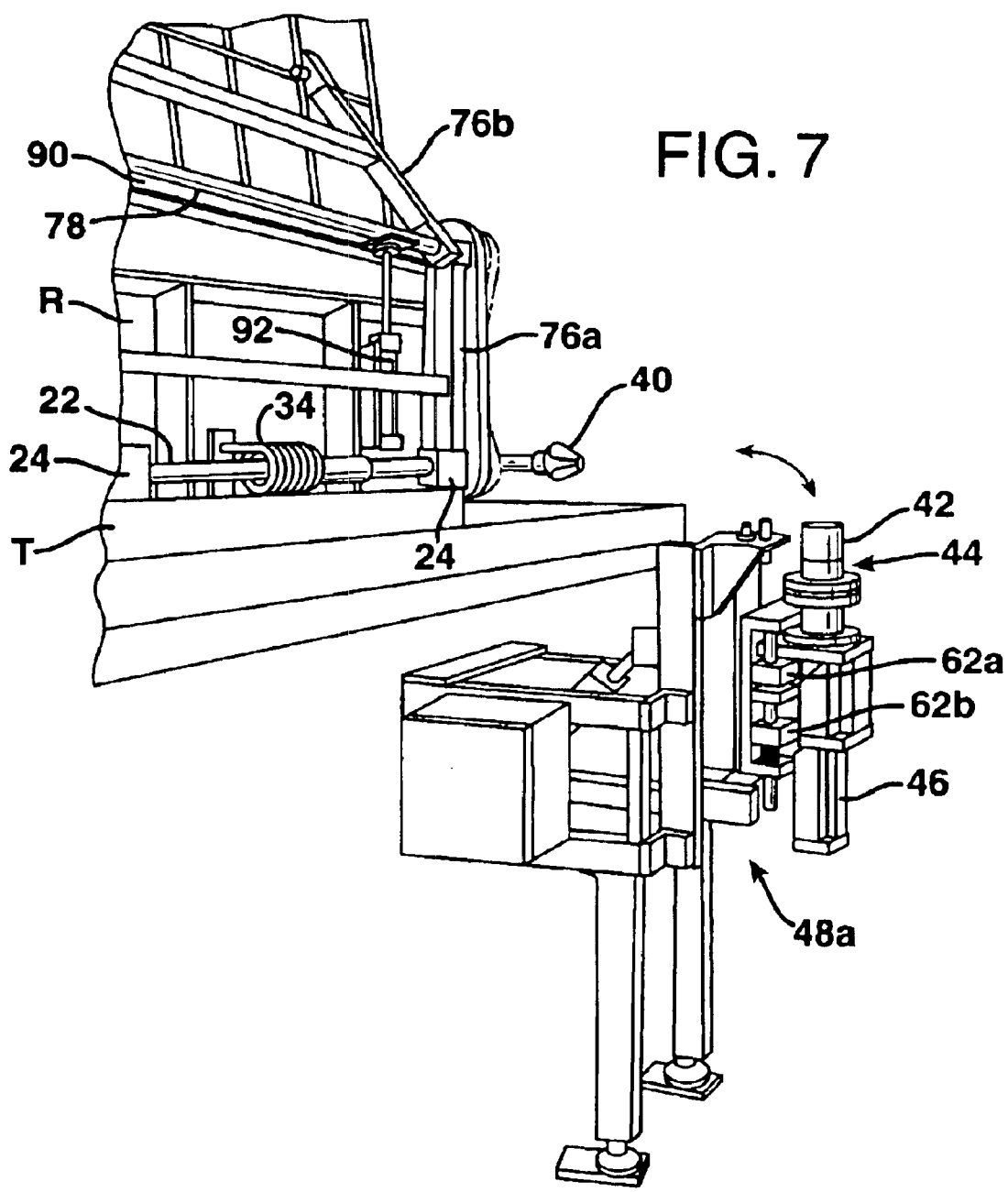

AUTOMATED PROCESS AND APPARATUS FOR FORMING A MOLDED ARTICLE

This application claims the benefit of U.S. Provisional Application Ser. No. 60/261,924, filed Jan. 16, 2001, entitled "Automated Process and Apparatus for Forming a Molded Article," and U.S. Provisional Application Ser. No. 60/266,742, filed Feb. 6, 2001 bearing the same title, both of which are incorporated herein by reference.

TECHNICAL FIELD AND INDUSTRIAL APPLICABILITY OF THE INVENTION

The present invention relates generally to the molding art and, more particularly, to an improved process for forming preforms used in a molding process.

BACKGROUND OF THE INVENTION

A process for forming a preform for use in a subsequent molding process is disclosed in U.S. Pat. No. 5,935,509, the disclosure of which is incorporated herein by reference. It involves applying or depositing a layer of discontinuous or chopped mineral (glass) fibers to the sides of a mold or overform having a shape or contour that corresponds to the desired shape of a resultant preform which, in turn, has a shape corresponding to that of a resultant composite product (for example, an open top liner for use in lining a truck bed or the like). The mold is formed of a screen or other perforated support, and the application of the fibers is usually completed by way of spraying them, either separate from or along with a dry (powder) or wet (liquid) binder that is also applied to the mold. A continuous vacuum is applied to a chamber in fluid communication with the mold. The resulting vacuum drawn through the perforations ensures that the chopped fibers and binder are pulled and remain held against the mold during this application step. Once this application step is complete, the composition is subjected to a curing process to cure the binder and hence form the molded article or preform.

The curing process usually requires transporting the mold carrying the composition from the Aspray@ station to a curing station. At the curing station, an overhead convection oven is lowered over the mold and activated to cure the binder. Transporting the molded article or preform to the curing station is usually accomplished by moving the mold on a wheeled trolley, and generally requires first removing the source of vacuum pressure. A necessary precursor to removing the vacuum and/or lowering the oven into place is the placement of large, perforated metal plates called Acompaction screens@over the side and top portions of the mold. These screens not only ensure that the previously applied, uncured composition is held in place, even when the vacuum is removed, but also serve to: (1) protect the composition from making direct contact with the inside surfaces of the oven; and (2) provide a moderate degree of compaction.

After curing is complete and the oven retracted, the mold is transported to a Aremoval@ or recovery station. At this station, the compaction screens are manually removed and the molded article or preform recovered, such as by bodily lifting it from the mold. The operation is then repeated as necessary or desired to form additional molded articles or preforms.

Since the manual placement and removal of even a single compaction screen from the mold is a time consuming and labor intensive operation, automating this aspect of the molding process is generally desirable.

SUMMARY OF THE INVENTION

In accordance with a first aspect of the invention, an automated assist apparatus is disclosed for use in a system for forming a molded article from a composition comprised of a plurality of chopped mineral fibers and a binder applied to at least one portion of a perforated mold and initially held in place by a vacuum drawn through the perforations before undergoing a curing process. The apparatus comprises at least one holding device for holding the composition applied to the at least one portion of the perforated mold in place both prior to and during the curing process and a motive device for automatically moving the holding device from a first retracted position away from the mold to a second position for holding the composition in place. As a result of the holding force, the vacuum may be released when the holding device is in the second position, and the composition subjected to the curing process. The holding device may then automatically move to the first retracted position for removing the cured molded article from the mold.

In one embodiment, the holding device includes at least one perforated screen that in addition to holding the composition in place, also serves to at least moderately compact the composition on the corresponding portion of the mold. The holding device may comprise only one such screen having a surface area corresponding to the surface area of the portion of the mold. The motive device may include a first rotatable shaft journaled in a plurality of supports, a support assembly having a first end for supporting the holding device and a second end coupled to the rotatable shaft, and a first motor for selectively engaging and rotating the shaft to move the support assembly and hence the holding device between the first and second positions. In one embodiment, the support assembly comprises a fixed frame having a pair of upper legs, each carrying a bracket for supporting the holding device, and a pair of lower legs having apertures that receive the first rotatable shaft. In a second embodiment, the support assembly includes a pivoting frame including a first subframe forming the first end and a second subframe forming the second end. The first and second subframes are coupled together by a second rotatable shaft such that the second subframe is capable of pivoting relative to the first subframe while the entire support assembly is moved between the first and second positions as a result of the rotation of the first rotatable shaft.

Preferably, the first motor of the motive device has a receiver for coupling with a corresponding coupler on the first rotatable shaft. A mounting assembly comprising an actuator, such as a linear actuator, for moving the motor and hence the receiver toward and away from the corresponding coupler on the first rotatable shaft is also provided. A support stand assembly may also be provided for supporting the first motor, wherein the support stand assembly is capable of moving the first motor between a first retracted position and a second position such that the receiver is in axial alignment with the coupler on the shaft. The support stand assembly may either pivot the first motor between the first and second positions, or raise and lower the first motor between the first and second positions.

In one embodiment, the mold includes a plurality of side portions, and the apparatus further comprises a separate holding device for holding the composition applied to each side portion of the perforated mold in place. A motive device is also provided for automatically moving each separate holding device from a first retracted position to a second position for holding the composition in place. One side of the mold may also be a top portion that together with a plurality of lateral portions defines a box shape for creating a liner having plurality of sidewalls and a base. In that case, the holding device for the top portion is a compaction screen carried in a motive device in the form of an overhead oven that is lowered over the mold to cure the composition and form the molded article.

The motive device may also include a first motor for moving the holding device from the first position to the second position at a spray station where the composition is applied and a second motor for moving the holding device from the second position to the first position at a removal or recovery station after curing is complete. Preferably, a plurality of holding devices and a plurality of the first and second motors corresponding to each of a plurality of sides of the mold are provided at both the spray and removal/recovery stations.

In the case where the side of the mold extends in a vertical direction, the holding device may include a compaction screen for covering the vertically extending side of the mold and a shoulder rail for covering a lower side edge of the composition between the compaction screen and the adjacent side of the mold. A second motive device serves to move the shoulder rail between a first retracted position and a second position adjacent to the mold both before and after curing is complete. The second motive device may comprise at least one pneumatic cylinder for moving the shoulder rail and the apparatus further includes a pneumatic supply apparatus. The pneumatic supply apparatus may be mounted on a laterally translating base for moving to and fro into engagement with a valve block having at least one valve in fluid communication with the pneumatic cylinder. As a result of this mounting, the pneumatic supply apparatus may be retracted before curing and actuated after curing is complete.

In accordance with a second aspect of the invention, a system for forming a molded article from a composition comprised of a plurality of chopped mineral fibers and a binder is disclosed. The system comprises a perforated mold having at least one side portion for receiving the composition, a vacuum source for drawing a vacuum through the perforations in the base, at least one holding device for holding the composition applied to the side portion of the perforated mold in place, and at least one first motive device for automatically moving the holding device from a first retracted position away from the mold to a second position for holding the composition in place. The vacuum is released when the holding device is in the second position, the composition is subjected to a curing process, and the holding device is automatically moved to the first retracted position for removing the cured molded article from the mold.

In one embodiment, the system further includes a trolley for supporting the mold and moving it between a first station where the composition is applied and a second station where the composition is cured. The first motive device may comprise a first rotatable shaft journaled in a plurality of supports, a support assembly having a first end for supporting the holding device and a second end coupled to the rotatable shaft, and a first motor for selectively engaging and rotating the shaft to move the support assembly and hence the holding device between the first and second positions. Preferably, the shaft and support assembly are supported on the trolley and the system further includes a stand assembly for supporting the first motor at the first station. In addition to the first and second stations, the trolley may move the mold to a third station for removing the molded article after curing. In that case, the motive device further includes a second motor at the third station for moving the holding device from the second position to the first retracted position. The second motor may be supported by a separate stand assembly.

In accordance with a third aspect of the invention, an automated process for forming a molded article from a composition including a plurality of mineral fibers applied to at least one side of a perforated mold supported on a stable support structure and held in place by a vacuum drawn through the perforations is disclosed. The process comprises the step of automatically positioning a holding device over the composition applied on the at least one side portion of the mold. As a result, the composition is held in place on the mold in the substantial absence of the vacuum without the need for manual intervention by a worker.

In one embodiment, the holding device is a compaction screen, and the automatic positioning step includes actuating a motive device to move the compaction screen from a first position away from the mold to a second position wherein the composition is held between the compaction screen and the mold. The composition may further comprise a binder, in which case the process further includes subjecting the composition on the mold to a curing process to create the molded article. The process may further include the step of retracting the holding device once the curing process is complete to allow for recovery of the molded article.

In accordance with a fourth aspect of the invention, an automated process for forming a molded article is disclosed. The process comprises the steps of applying a vacuum to a perforated mold having at least one side portion; applying a composition including a plurality of chopped mineral fibers and a binder to at least the side portion of the mold; automatically positioning a holding device adjacent to the side portion of the mold to hold the composition in place when the vacuum is removed; and curing the composition to form the molded article. The method may further comprise automatically removing the holding device from adjacent the side portion of the mold after the curing step and removing the molded article after the holding device is automatically removed.

BRIEF DESCRIPTION OF THE DRAWING FIGURES

FIG. 7 is a perspective view showing in elevation yet another side of the stand assembly of FIGS. 5 and 6;

DETAILED DESCRIPTION AND PREFERRED EMBODIMENTS OF THE INVENTION

Figure 1:
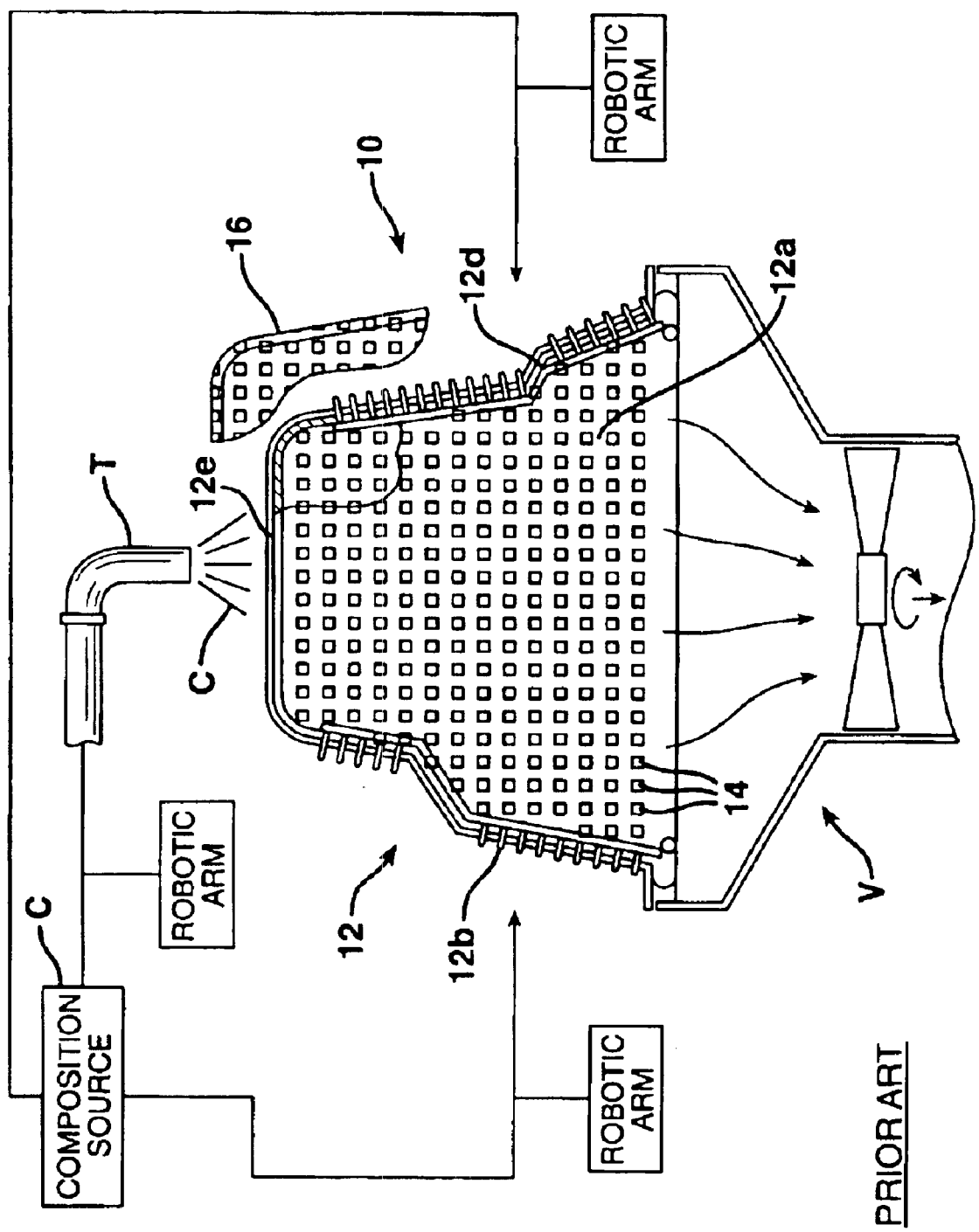
FIG. 1 illustrates in a partial schematic form the system used in forming a molded article having a mold including a plurality of perforations through which a vacuum is drawn to hold a composition comprised of a plurality of chopped mineral fibers and a binder in place prior to curing.

Reference is now made to FIG. 1, which illustrates the basic system 10 for forming a molded article (not shown). The molded article may comprise a preform for later use in a structural reinforcement injection molding (SRIM) process, as is well known in the art. The conventional system 10 for forming such an article includes a mold 12 having a plurality of openings or perforations 14 that create a screen-like surface. The mold 12 may include at least one, and preferably a plurality of lateral portions 12a–12d (only one shown and two others identified in the side view of FIG. 1) that extend substantially vertically and connect with a substantially planar, horizontally extending top portion 12e. At least one supply tube T is in communication with a source, such as a hopper (not shown) holding a composition C comprised of a plurality of discontinuous or chopped mineral (glass) fibers. A binder, which may be a wet, liquid binder or a dry powder binder, is either applied separately or simultaneously with the chopped fibers, as is also well known in the art. Preferably, the system 10 includes a plurality of supply tubes T (one shown) that are capable of moving to and fro to apply, or spray, the composition C over the entire outer surface of the mold 12, such as through the use of robotic arms or the like (note schematic blocks).

A vacuum source V, such as a fan, in fluid communication with the mold 12 serves to draw a vacuum through the perforations (see action arrows in FIG. 1). The negative pressure created by the vacuum serves to hold the composition C including the fibers and the binder against the outer surface of the mold 12. In one example of the conventional process, a worker then manually places a cover 16 (which may be unitary as contemplated in the embodiment of FIG. 1, or comprised of a plurality of separate sections or screens) over at least the vertically extending lateral sides 12a–12d of the mold 12, and preferably over the top side 12e as well. This cover 16 not only compacts the composition C against the mold 12, but ensures that it remains held in place when the vacuum source V is stopped or the vacuum is otherwise removed or disengaged, such as if a trolley T (not shown in FIG. 1) carrying the mold 12 is moved toward a curing station (such as one including an overhead oven (not shown)) to cure or soften the binder and form the molded article or preform. As implied by the foregoing sentence, the binder may be either thermoset or thermoplastic, with the particular selection having no bearing on the present invention. Once curing is complete, the cover 16 is manually removed by the worker and the molded article/preform removed from the mold 12. A basic description of one possible version of an article forming system 10 similar to that described above and the related process for forming a molded article is found in the above-reference U.S. Pat. No. 5,935,509 to Elliott, which is incorporated herein by reference.

Figure 2:
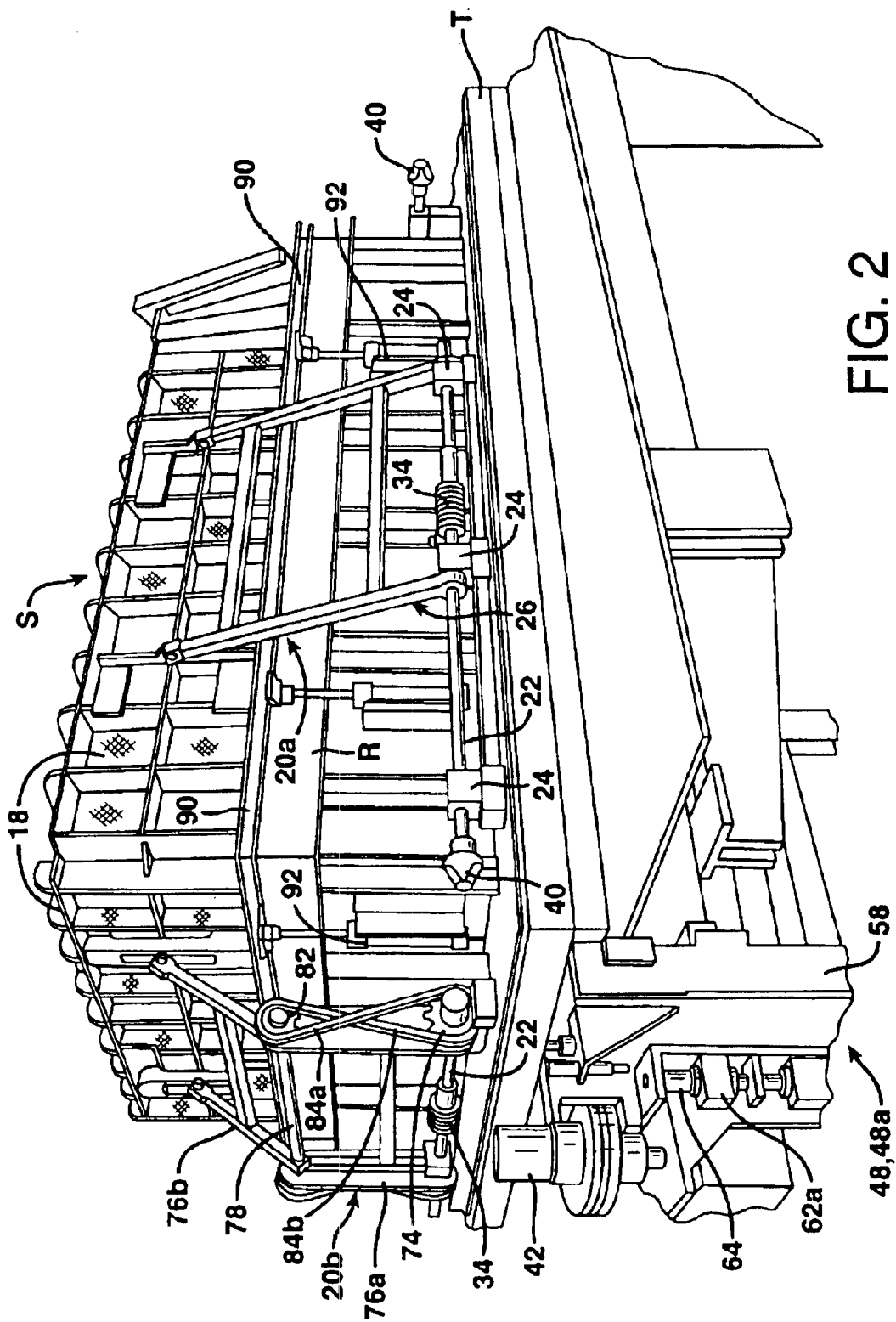
FIG. 2 is a perspective view of one embodiment of the system showing the trolley, riser, and portions of the two different embodiments of motive devices that may be used to move the compaction screen from a first retracted position to a second position adjacent the corresponding side of the mold.
Figure 3:
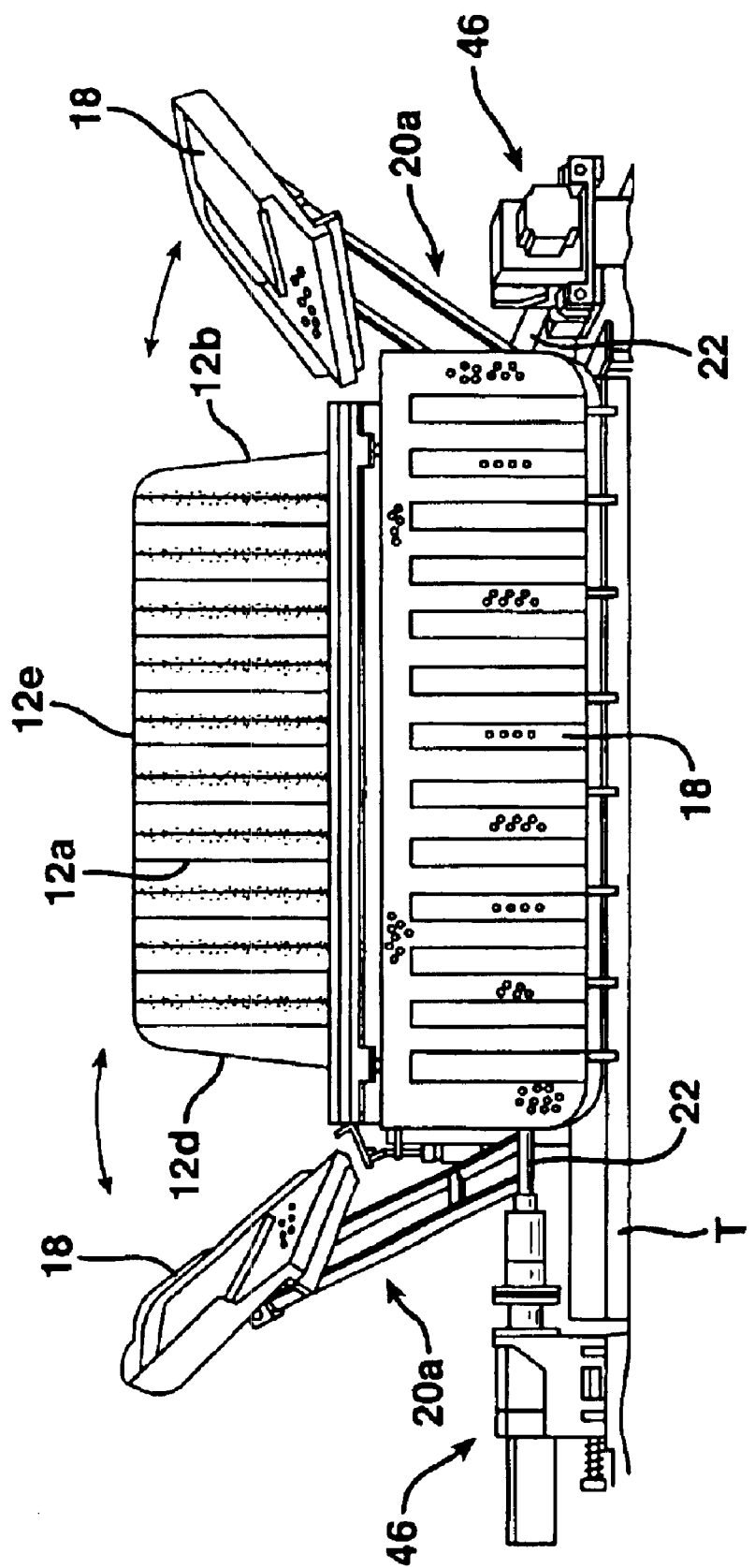
FIG. 3 is a partially cutaway side elevational view of the mold with the compaction screens or holding devices in the retracted position.

With reference now to FIGS. 2 and 3, the improved system S of the present invention overcomes the limitations and shortcomings associated with the conventional system 10 and process described above by automating the Acovering@ and Auncovering@ steps that are normally manually completed by a worker. Specifically, as shown in FIG. 2, the mold 12 is supported on a riser R. The riser R is supported on a trolley T, that in turn includes a ledge for supporting a plurality of movable holding and compaction devices in the form of perforated, plate-like screens 18 and corresponding motive devices 20a or 20b. These screens 18 may be identical in construction and preferably have a dimension and surface contour that corresponds to that of the corresponding portion of the mold 12 (which is often corrugated to create a molded article or preform having strategically positioned areas with an enhanced degree of compaction to create integral strengthening ribs). As noted above, the screens 18 are termed Acompaction screens@ in the art, since in the operative position adjacent to the corresponding side or portion of the mold 12a–12e, they essentially serve to Acompact@ or otherwise compress the composition C previously applied. Additionally, it should be appreciated that the screens 18 on the vertically extending, lateral side portions 12a–12d of the mold 12 perform the dual function of assisting in holding the composition C in the desired position when the vacuum is removed both prior to and during the curing process.

As briefly noted in the foregoing paragraph, each holding and compaction device or screen 18 is independently attached to a motive device, and three possible types of motive devices 20a, 20b, 20c are disclosed herein. As outlined in detail in the description that follows, the motive devices 20a–c serve to automatically move each corresponding compaction screen 18 from a first retracted position away from the corresponding side 12a–12e of the mold 12 to a second, juxtaposed position for holding the composition in place, or vice versa to allow for the recovery of the molded article once curing is complete. The three different embodiments of motive devices include: (1) a first motive device 20a for use on sides of the mold 12 where clearance from obstacles on the riser R is not a concern, as shown: (a) in the second position in the forefront of FIG. 2; and (b) in partial retraction moving toward the first, fully retracted position adjacent to the left and right sides of the mold 12 in FIG. 3; (2) a second motive device 20b for use on sides of the mold 12 wherein the riser R or other objects may serve as obstacles to the movement of the screen using the first motive device 20a, as shown: (a) in the second position at the left hand side of FIG. 2; and (b) in FIGS. 3 and 4e at or near the retracted first position; and (3) a third motive device 20c in the form of a moving overhead convection oven (not shown) that carries a top compaction screen 18 that is lowered over the upper side 12e of the mold 12 and retracted along with the oven.

Figure 2A:
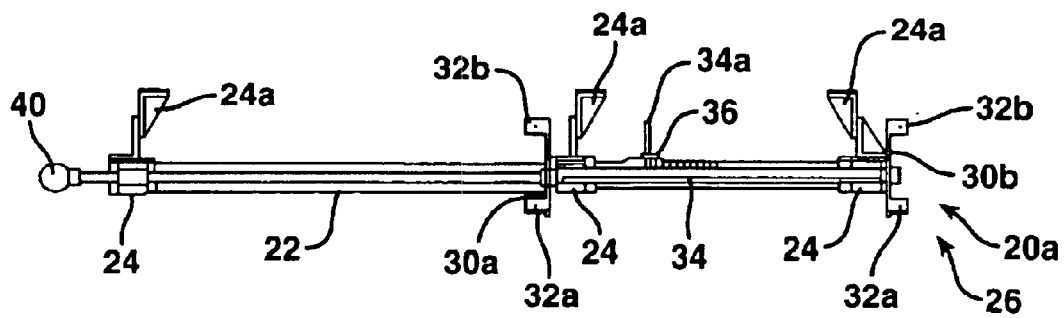
FIGS. 2a and 2b are top plan and side elevational views, respectively, of one embodiment of the first motive device.
Figure 2B:
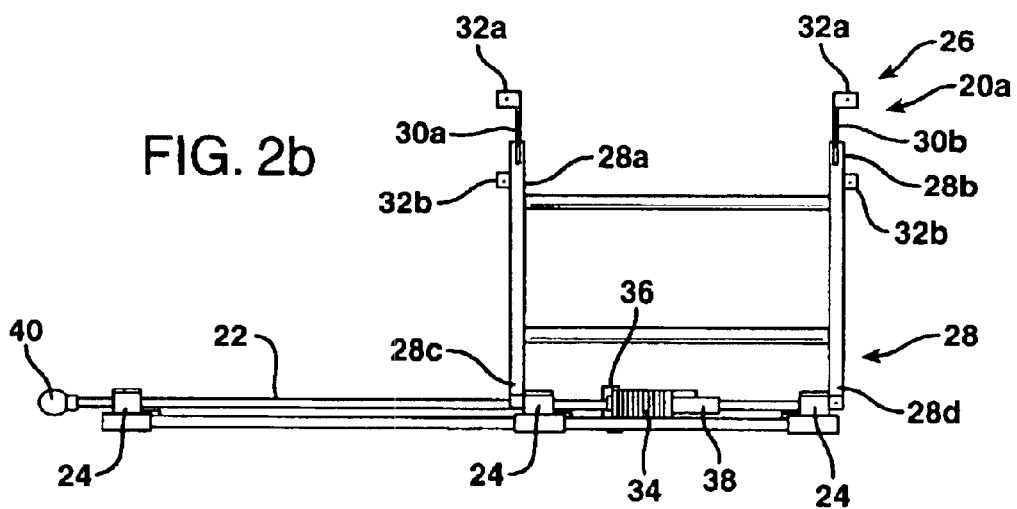

First describing the first motive device 20a, and perhaps best shown in FIG. 2, it comprises: (1) a first rotatable shaft 22 journaled in a plurality of supports 24; and (2) a support assembly 26 including a fixed, H-shaped support frame 28. With reference to FIGS. 2a–2b, which show part of the first motive device 20a used on at least one lateral side of the mold 12, the support frame 28 has a first end including a first or upper pair of legs 28a, 28b for supporting the corresponding holding device or compaction screen 18, and a second end including a second or lower pair of legs 28c, 28d that each receive and are fixedly coupled to the first rotatable shaft 22 (such as by transversely extending, removable locking pins, not shown). Each upper leg 28a, 28b supports a fixed bracket 30a, 30b, with each bracket 30a, 30b having a pair of ears or flanges 32a, 32b (see FIG. 2a). These ears or flanges 32a, 32b are provided with apertures (not numbered) for receiving the fasteners that secure the holding device or screen 18 to the support assembly 26 of each first motive device 20a. As best shown in the top views of FIGS. 2a and 2c, the supports 24 for the shaft 22 may also carry brackets 24a for attachment to a stable support structure, such as the vertically extending sidewall of the riser R for supporting the adjacent mold 12 (see FIG. 2).

As also shown in FIGS. 2a–2b, an optional torsion spring 34 is also carried on each shaft 22. With reference to FIG. 2a, the spring includes a first leg 34a that is held in a stationary bracket 36 (which may be carried by a structure forming a part of the motive device 20a, or another stable support structure associated with the adjacent mold 12). The opposite leg (not shown) is held in a receiver (not numbered) carried on a spring tube 38 fixed to and rotating with the shaft 22. The functioning of the spring 34 associated with each motive device 20a (as well as with each motive device 20b) is outlined further in the description that follows.

Figure 3A:
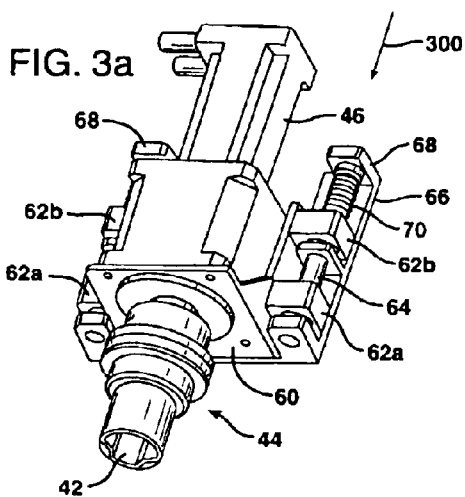
FIGS. 3a–3d are various views of the motor forming a part of the motive device and the corresponding support base.
Figure 3B:
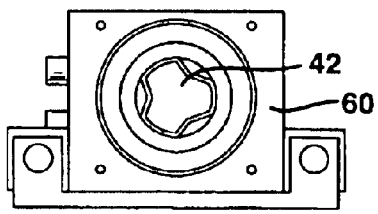
Figure 3C:
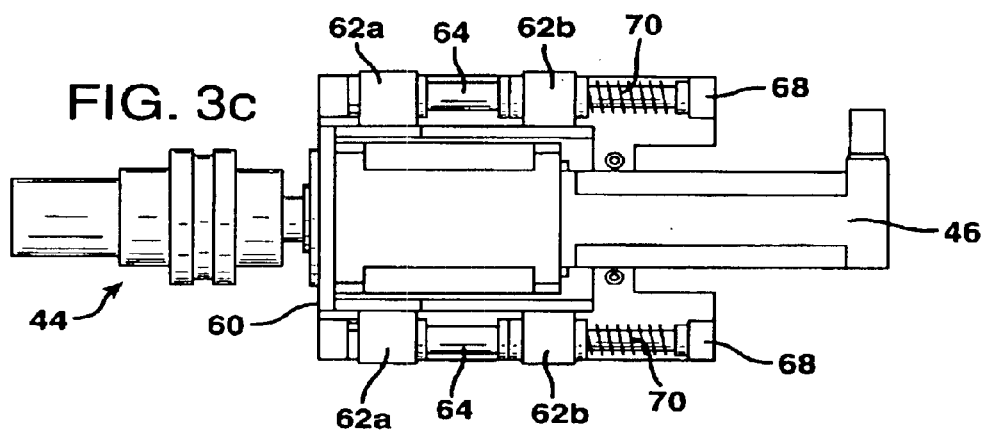
Figure 3D:
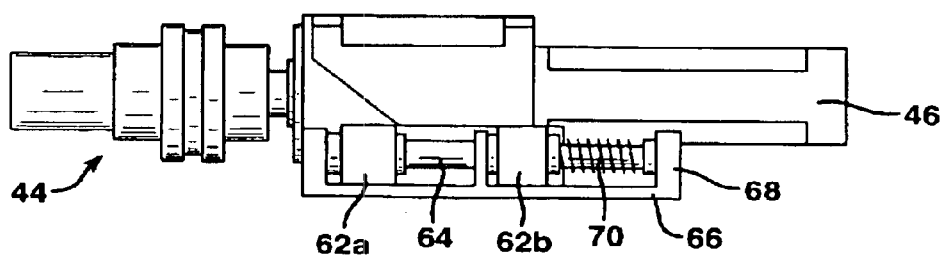
Figure 3E:
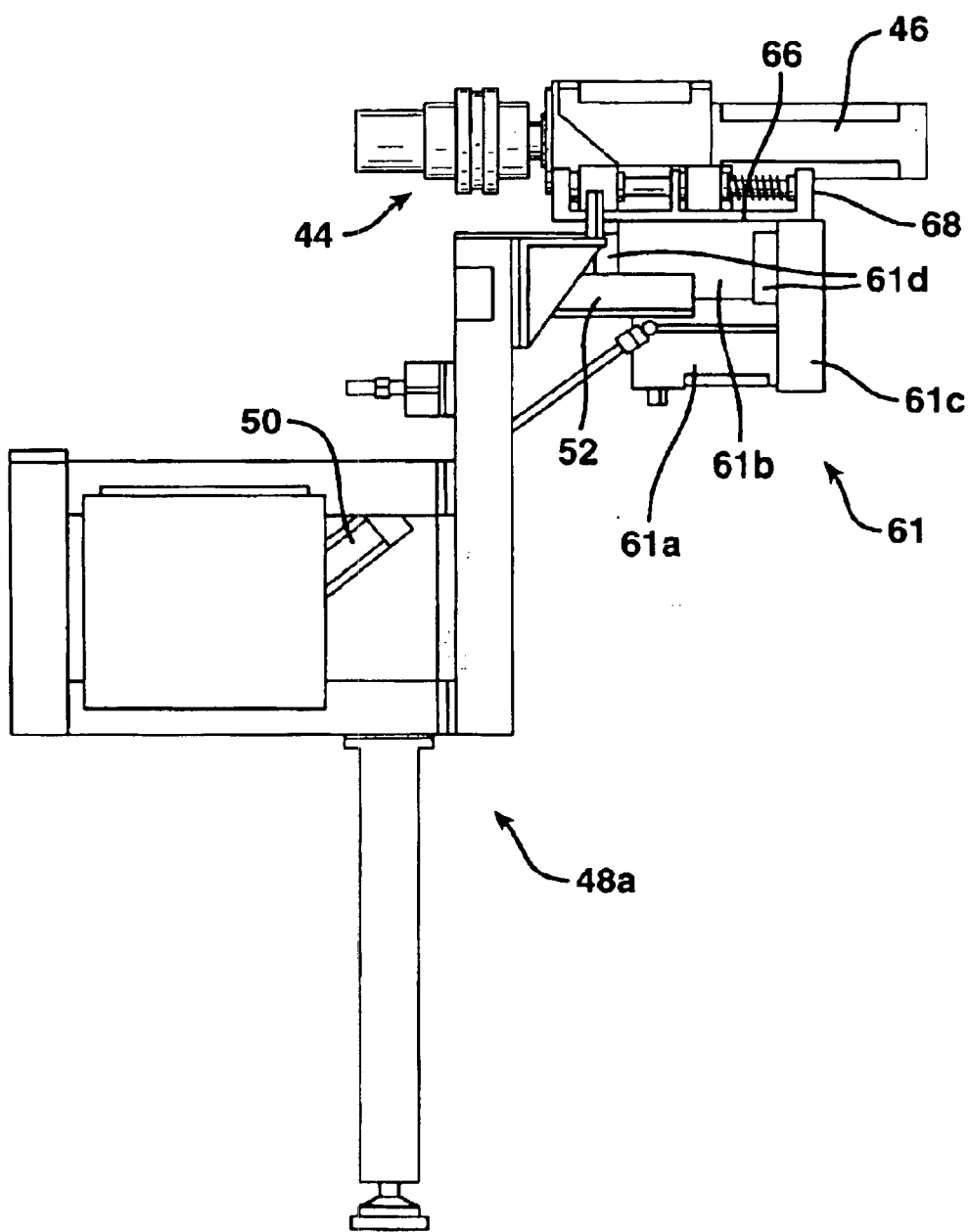
FIGS. 3e–3i are various views of the motor and a support stand assembly that allows the motor to pivot to a retracted position.
Figure 3F:
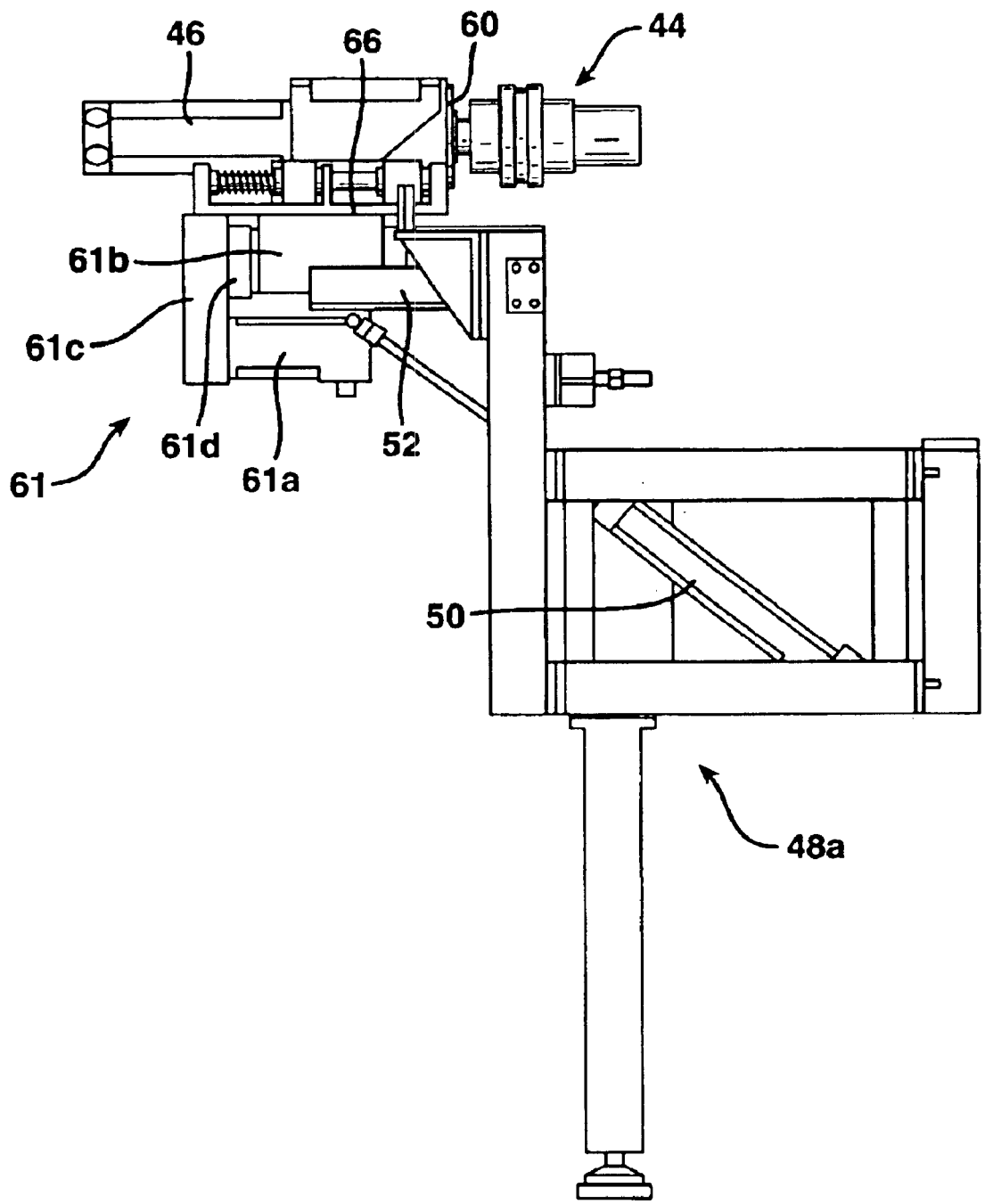
Figure 3G:
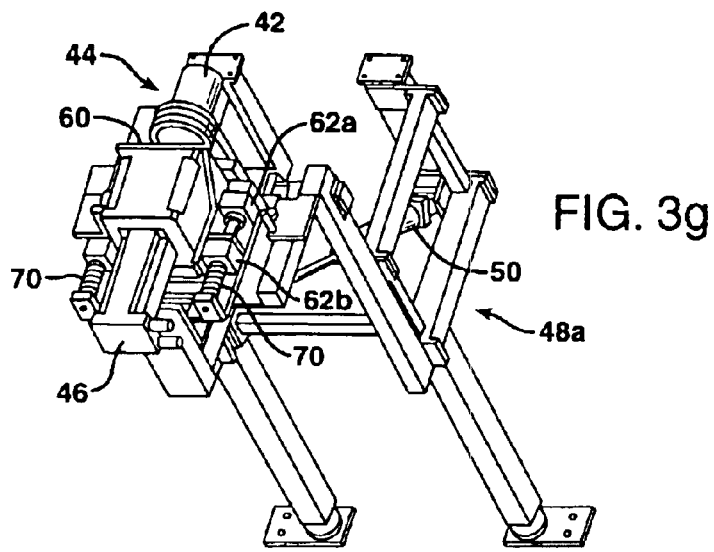
Figure 3H:
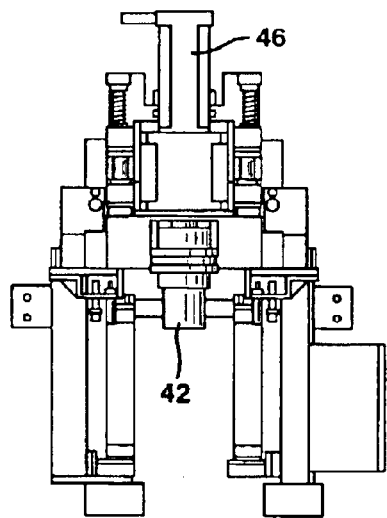
Figure 3I:
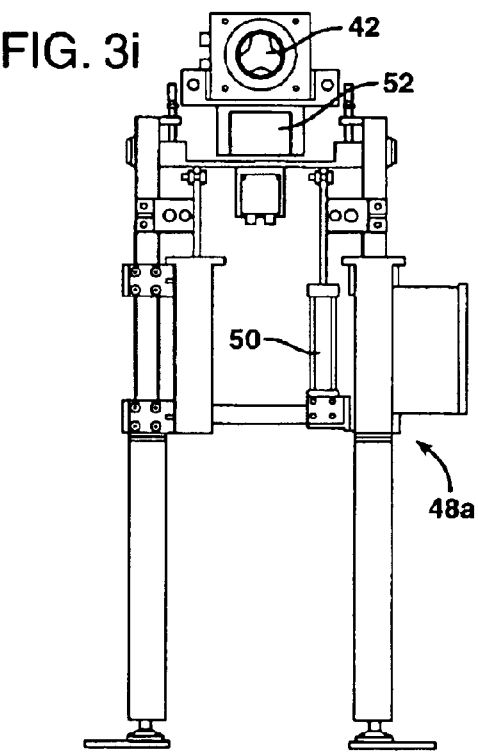
Figure 8:
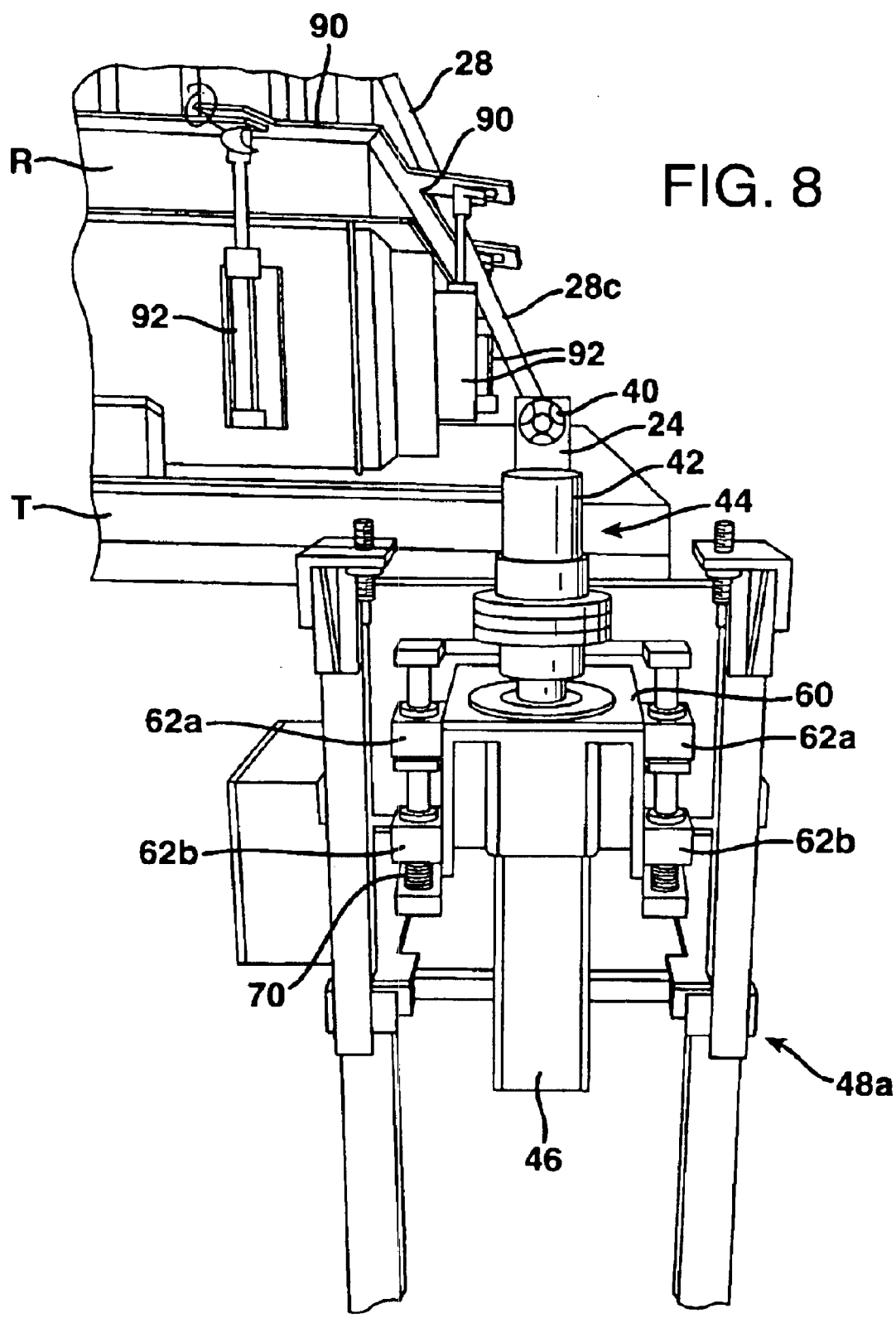
FIG. 8 is a partially cutaway side elevational view of the motor and stand assembly of FIGS. 3e–3i.
Figure 9:
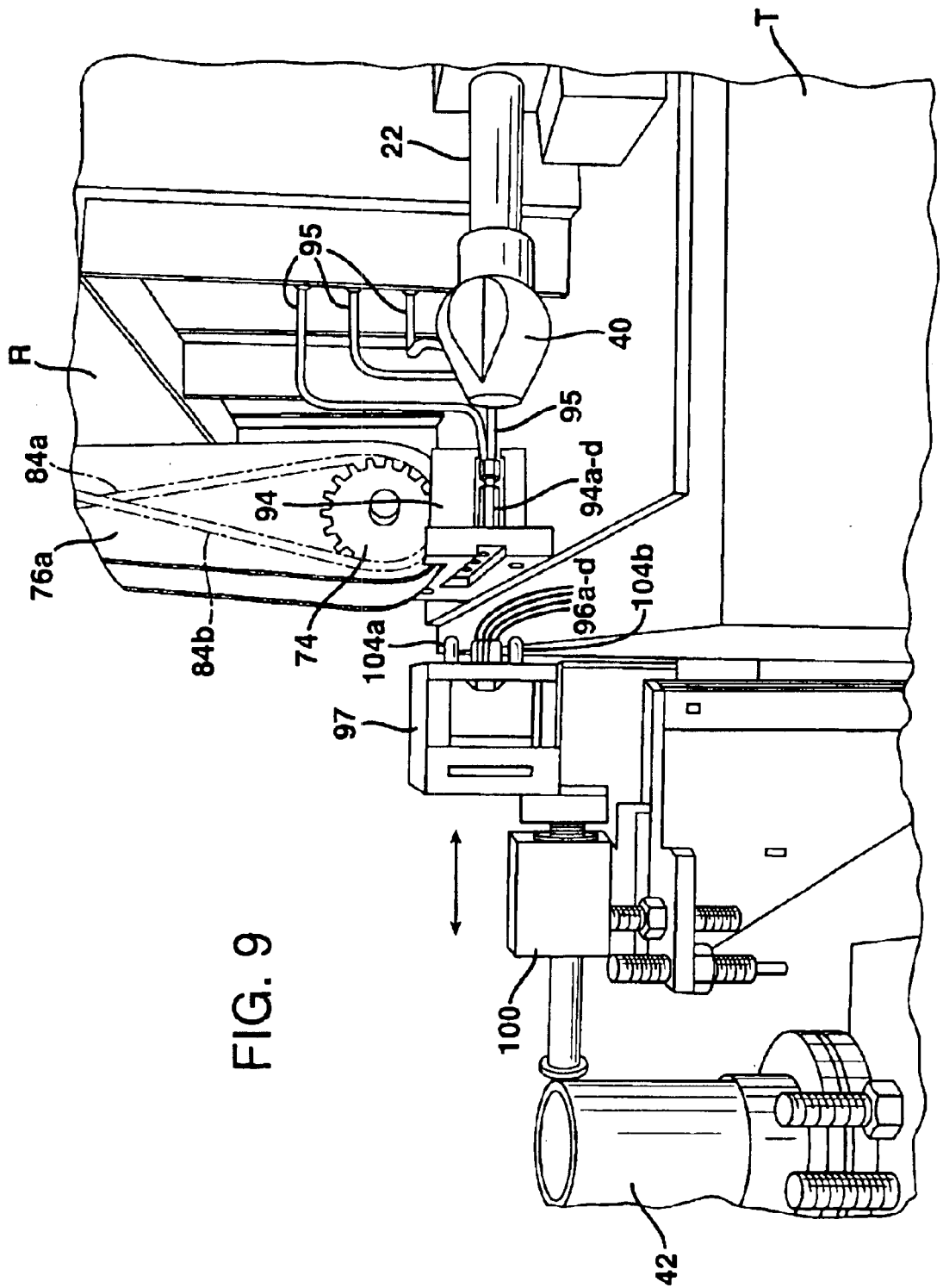
FIG. 9 is an enlarged partially cutaway side elevational view showing a valve block and corresponding pneumatic supply assembly.
Figure 9A:
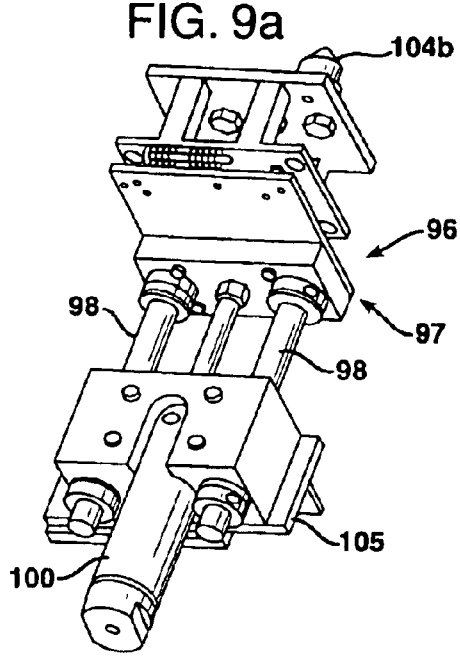
FIGS. 9a–9d are various views of the pneumatic supply assembly of FIG. 9.
Figure 9B:
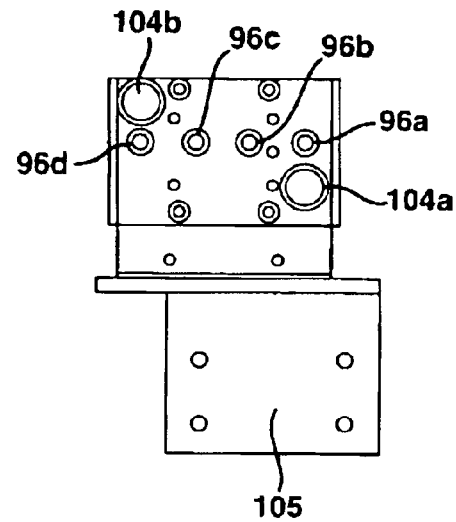
Figure 9C:
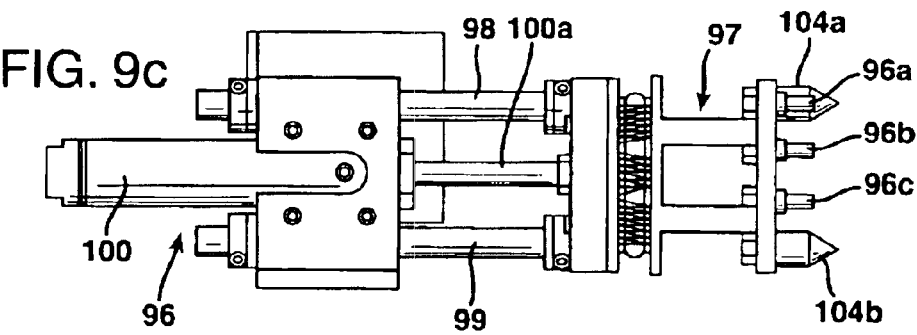
Figure 9D:
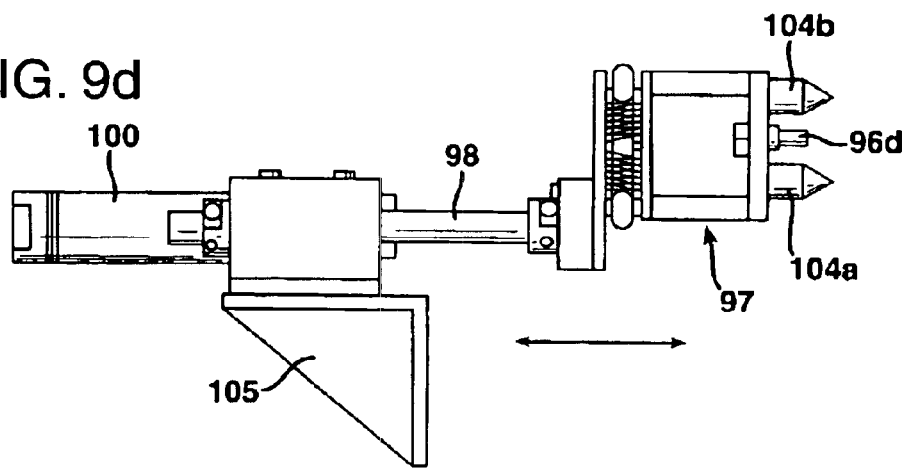

At least one end of the shaft 22 of each first motive device 20a carries a coupler, and preferably a male coupler 40 having a plurality of lobes (not numbered). Preferably, three such lobes are provided having centers spaced about 120 degrees apart (see FIGS. 2, 8 and 9). As perhaps best shown in FIGS. 3a and 3b, a corresponding socket or receiver 42 is provided on an output shaft assembly 44 of a first motor 46 also forming a part of each first motive device 20a. The motor 46 is preferably a servo motor that is capable of rotating in either direction at a variable speed. Hence, when a coupling is formed between the male coupler 40 and the receiver 42 and the motor 46 is activated, the shaft 22 is caused to rotate. The resultant motion of the support assembly 26 caused by the rotation of the shaft 22 moves the holding device or screen 18 between the first, retracted position away from the corresponding side of the mold 12 and the second position in engagement with the previously applied composition C that eventually forms that side of the molded article or preform. This or a similar operation simultaneously occurs along at least one, and preferably all four lateral sides of the mold 12a–12d (and as outlined in more detail in the description that follows, the top of the mold 12e) to move each corresponding compaction screen 18 between the first, retracted position and the second juxtaposed position, and vice versa.

As noted above, the mold 12 and corresponding riser R are mounted on the movable trolley T, see FIG. 2. The trolley T is used to transport via rails (not shown) the mold 12 from the Aspray-up@ or spray station where the composition is applied, to a curing station where it is engaged by an overhead convection oven that is lowered over the compaction screens 18 and mold 12 for curing the binder in the composition C, and eventually to a removal station. To permit the trolley T to move in this desired manner to the curing station, but avoid subjecting the motors 46 and other temperature sensitive components or parts of the system S to the heating process, separate stands 48 for supporting each motor 46 along the corresponding side of the mold 12 (and preferably at the corners) are provided at both the spray station and the removal station. Hence, by using these motors 46, the holding devices or screens 18 may be moved into position and removed at each location. The stands 48 for supporting the motors 46 may take many forms, and two examples are provided herein.

In one possible form, see FIGS. 3e, 3f, 3g, 3h, 3i, 4e, 7, and 8 the stand 48a carries an actuator for moving the motor 46, such as a pair of pneumatic or hydraulic cylinders 50 that are coupled to a base 52 supporting the motor 46. This base 52 is pivotally mounted to the stand 48a, such that when the cylinders 50 are pressurized, the motor 46 assumes a first position wherein the receiver 42 of the output shaft assembly 44 is adjacent to the male coupler 40 and in axial alignment with the shaft 22 (see FIG. 4e, but note that the receiver 42 at the end of the output shaft assembly 44 is initially spaced from the end of the shaft 22 until a further operation is completed, as described below). Conversely, when the pressure is released or otherwise removed from the cylinders 50, the base 52 and hence the motor 46 pivot and thus revert to a retracted position. As should be appreciated, this allows for the motor 46 to be moved out of the way, such as for allowing robotic spraying arms (not shown) to move close to the adjacent portion of the mold 12 at the spray station, or for allowing similar arms at the removal station to retrieve the molded article.

The second form of stand 48b, shown in FIGS. 5, 6, 6a, 6b, and 6c essentially moves the motor 46 solely in a vertical direction, rather than pivoting it along an arcuate path to and from a retracted position. As with the pivoting stand 48a, the movement is between a first position where the receiver 42 is adjacent to and axially aligned with the coupler 40 and a second, retracted position. Rather than a pair of cylinders, this second type of stand 48b includes a pair of linear actuators 54, such as rodless air cylinders, each having a vertically translating engagement mechanism (not shown) coupled to a bracket 56 which defines the motor support base 52. By selectively actuating the actuators 54, the bracket 56, and hence the motor 46, can be moved between the first and second positions, as may be necessary to allow robotic sprayer arms (not shown) to move adjacent to the mold 12. An emergency brake (not shown), such as a spring-applied brake that is activated only upon a loss of systemwide pressure, may also be provided to keep the motor 46 from falling abruptly, should a power failure or the like occur when it is in the Aup@ position. Such a brake is commercially available from Tol-O-Matic Corporation as Model No. FS20PB. The brake is not a requirement on the first stand 48a, since the depressurization of cylinders 50 would simply allow the motor 46 and base 52 to pivot back to the retracted position. Shock absorbers or other stabilizers may also be provided for absorbing the vibrational forces acting on the motor 46 as it is abruptly moved in the vertical direction.

As briefly mentioned above, the receiver 42 on the output shaft assembly 44 of each motor 46 is preferably spaced from the corresponding coupler 40, even when the motor 46 is moved to the ready position adjacent to the shaft 22 using either type of active support stand 48a or 48b. To establish a secure connection between the coupler 40 and the receiver 42, an intermediate bracket 66 is fixedly coupled to a screw driven reciprocating engagement mechanism 61b of a horizontally positioned linear actuator 61, such that the bracket 66 moves with the engagement mechanism 61b, see FIGS. 3a–3f. A screw of the actuator 61 is coupled to a servo motor 61a via a belt 61c. When the motor 61a is actuated, the screw is rotated causing the engagement mechanism 61b of the actuator 61 to move linearly. A main housing 61d of the linear actuator 61 and the servo motor 61a are fixedly coupled to the motor support base 52. However, the engagement mechanism 61b of the linear actuator 61 is capable of moving vis-a-vis the motor support base 52. Specifically, and with reference back to FIGS. 3a–3d, a support bracket 60, to which the motor 46 is fixedly coupled, includes integral wings 62a, 62b having apertures that receive a shaft 64 fixedly supported by the intermediate bracket 66. Between the rearmost wing 62b on each side of the bracket 60 and an upstanding flange 68 of the bracket 66, a compression spring 70 is placed on each shaft 64. These springs 70 normally bias the wings 62a and 62b in a direction indicated by arrow 300, shown in FIG. 3a, when the motor 46 is spaced away from the coupler 40.

When the linear actuator 61 is actuated, the bracket 66, and hence the motor 46 and the receiver 42, are caused to move into engagement with the coupler 40. Once the lobes of the coupler 40 are fully received in the receiver 42, the springs 70 allow the bracket 60 to discontinue movement so as to prevent further movement of the receiver 42 toward the coupler 40 during continued movement of the bracket 66. As should be appreciated, once the lobes of the coupler 40 are initially aligned with the corresponding openings in the receiver 42, and despite the possible need for a periodic adjustment, the engagement should be easily established each time the motor 46 is moved laterally. A torque sensor (not shown) may also be associated with each motor 46 to initially measure the resistance created against the rotation of the shaft 22 during an initial turn to make sure that a secure coupling is established prior to fully actuating it.

Having described the first motive device 20a for possible use in the article forming system S, a second motive device 20b that could optionally be used on at least one side of the system will now be described in detail, with reference to FIGS. 4a–4b (third side), and 4c–4d (fourth side). As will be better understood upon reviewing the description that follows, this motive device 20b is specially adapted for use where there are obstacles (such as the jutting sides of the riser R, a limited ledge on the trolley T, or other structures required for the molding process) that would prevent the use of a fixed frame 28 of the type described above. It should also be appreciated from comparing FIGS. 4a–4b and 4c–4d, the only practical difference between the motive devices 20b used on the different sides is the direction in which the coupler 40 on the shaft 22 projects.

As with the first motive device 20a, the second motive device 20b includes a first rotatable shaft 22 carrying a spring 34/tube 38 combination. The shaft 22 is journaled in supports 24 mounted on the ledge of the trolley T adjacent to the riser R. In addition to supports 24, this first shaft 22 is journaled in a pair of fixed bearing supports 72, each carrying at least one, and preferably a pair of fixed sprockets 74 which do not move relative to the shaft 22.

Instead of forming the support assembly 26 from a single H-shaped support frame, the motive device 20b also includes a pair of H-shaped support subframes 76a, 76b which are capable of pivoting relative to each other, with the lower subframe 76a being fixed to the shaft 22. Specifically, the upper end of the first support subframe 76a and the lower end of the second support subframe 76b are both coupled to a second support shaft 78. The lower legs 80a, 80b of the second support subframe 76b are fixed to the shaft 78, and hence rotate with it, while the shaft 78 is journaled in the upper legs 81a, 81b of the first support subframe 76a.

The ends of the second support shaft 78 have fixed thereto at least one, and preferably a pair of sprockets 82 that correspond to sprockets 74 on the first shaft 22. As perhaps best shown in FIGS. 4c and 4d (which depict a left hand motive device 20b similar to the one shown in FIG. 4e), one of a pair of spaced, fixed length chains 84a, 84b (i.e., separate chains) engage each of the corresponding spaced sprockets 74 on each end of the first shaft 22 and the sprockets 82 of the corresponding end of the second shaft 78. Specifically, one end of each chain 84a, 84b is wound over a portion of and then fixed or attached to the corresponding upper sprocket 82, while the opposite end is wound over a portion of and fixed or attached to the corresponding lower sprocket 74. The connections are made in a manner such that the two chains 84a, 84b are maintained in different, spaced vertical planes. As perhaps best understood with reference to FIGS. 4a and 4b, a similar arrangement is also provided on the opposite side of the frames 76a, 76b.

The operation of the second motive device 20b will now be described in detail, assuming for purposes of illustration that the compaction screen 18 or other holding device is initially in a retracted position, as shown in FIG. 3. When the coupler 40 is engaged in a corresponding receiver 42 and its corresponding motor 46 is positioned and actuated such that the shaft 22 moves in a clockwise direction in the arrangement shown in FIGS. 4c and 4d, the first and second subframes 76a, 76b together are moved toward the adjacent mold 12. As this motion is continued, the innermost chain 84a on each side of the first subframe 76a is in tension, and thus "walks" or winds around the corresponding fixed sprocket 74 in a clockwise direction, which causes the corresponding upper sprocket 82 to rotate in a clockwise direction. At the same time, the opposite chain 84b on each side of the first subframe 76a is wound around the corresponding upper sprocket 82 as it rotates, and the opposite end of the chain begins to disengage or "unwrap" from the corresponding lower sprocket 74. As a result of this motion and the pivoting of the subframe 76a, the sprockets 82 are caused to rotate in a clockwise direction. This in turn rotates the shaft 78 and causes the second subframe 76b to pivot forward relative to the first subframe 76a, which is also moving forward.

As should be appreciated, by altering the diameter of the sprockets 74 and 82 and, hence, the ratio of teeth (assuming a constant pitch), the amount of relative pivoting motion can be selectively adjusted. In one possible embodiment, the ratios may be 18:23 or 15:25, respectively. Of course, the desired degree of pivoting action will depend on the angle at which the compaction screen 18 is mounted to the brackets 30a, 30b, the position at which the second subframe 76b is fixed to the shaft 78, the angle of the corresponding side of the mold 12, the amount of rotation that motor 46 provides, and possibly other factors depending on the particular application. In the preferred embodiment, a protective cover (not shown) is also provided over the sprockets 74, 82 and chains 84a, 84b along each side of each second motive device 20b to prevent external interference.

Figure 4A:
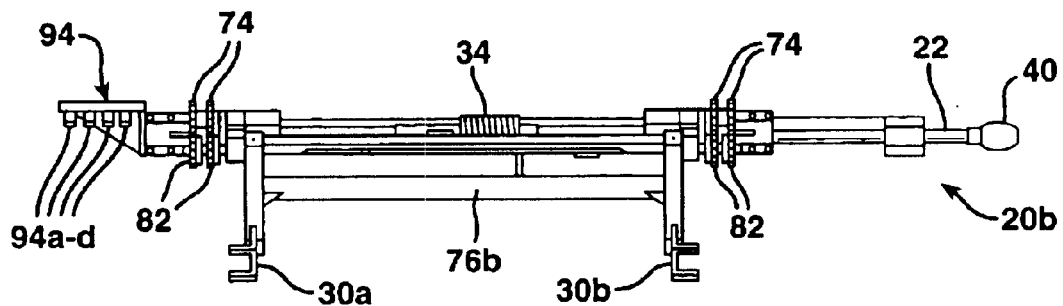
FIGS. 4a and 4b are top plan and side elevational views, respectively of one embodiment of the second motive device for possible use at one end of the system.
Figure 4B:
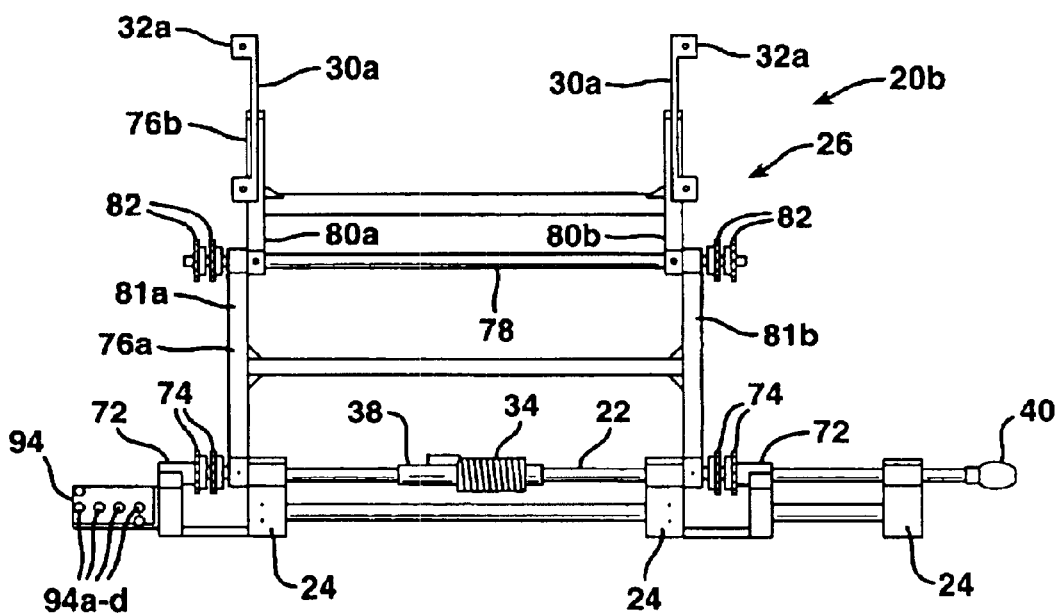
Figure 4C:
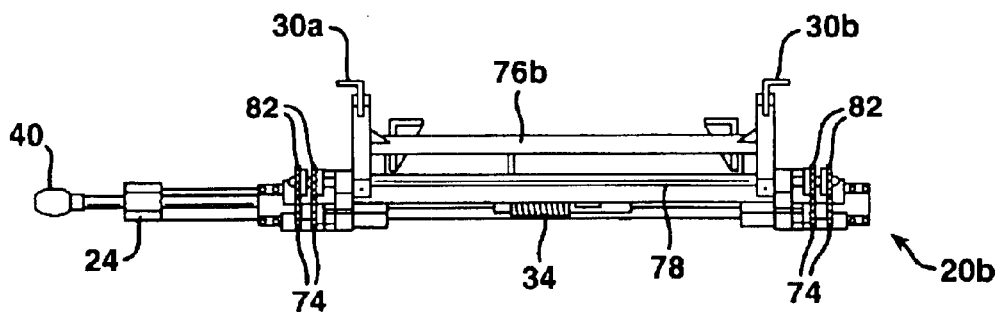
FIGS. 4c and 4d are top plan and side elevational views, respectively of one embodiment of the second motive device for possible use at another end of the system.
Figure 4D:
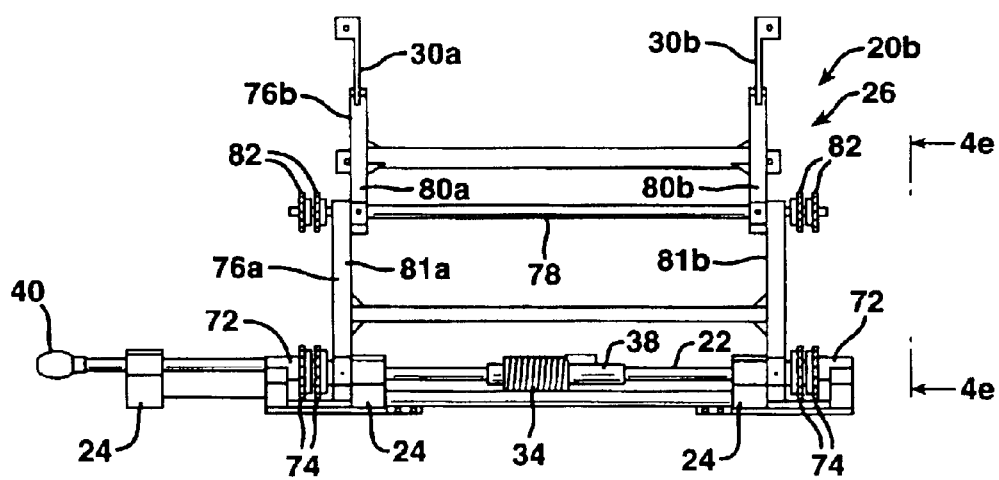
Figure 4E:
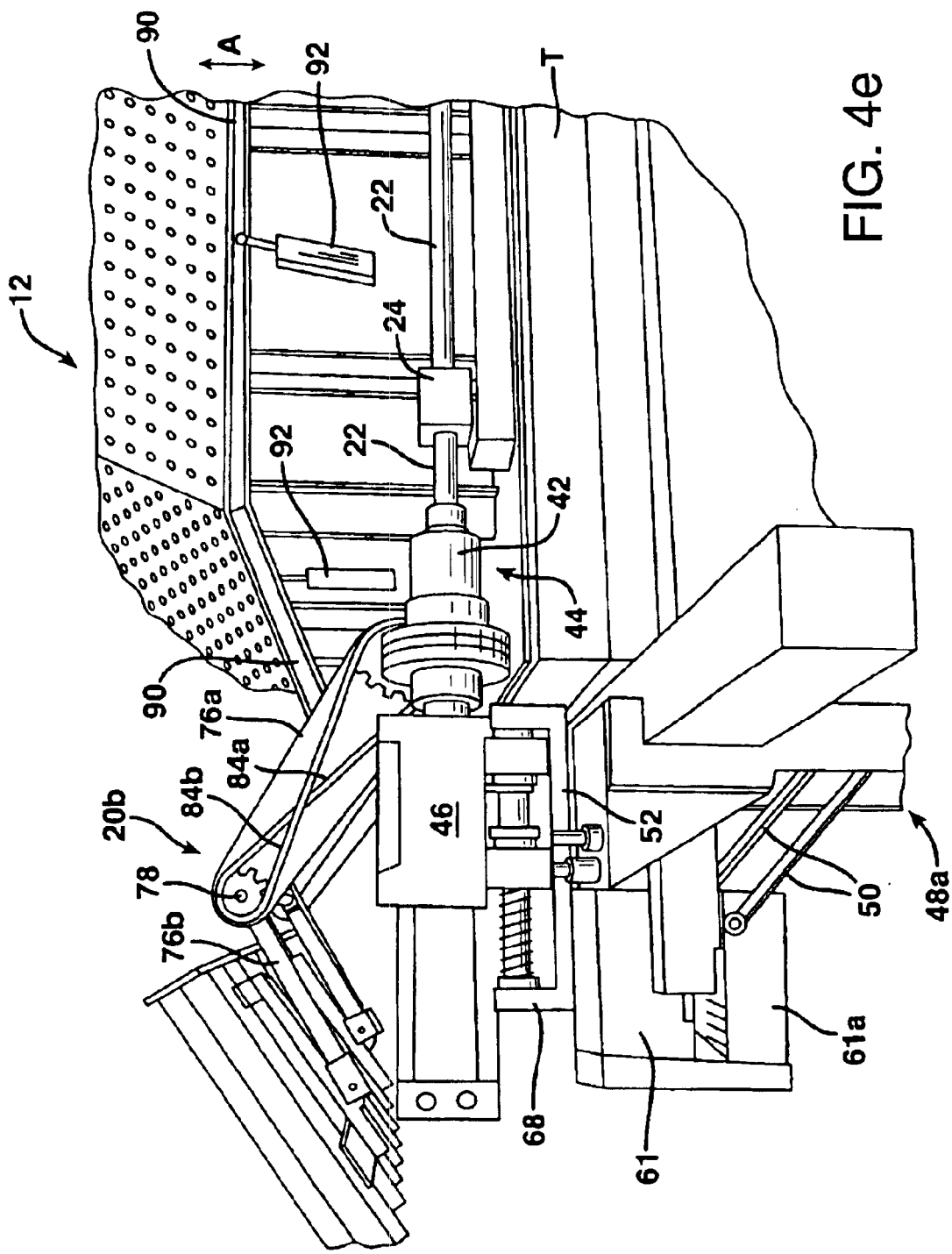
FIG. 4e is a perspective view of the portion of the apparatus shown in FIG. 4, taken from line 4—4 of FIG. 4d, illustrating the engagement of the receiver of the motor with the shaft in the foreground and the relative pivoting motion of the subframes of the second motive device in the background.
Figure 5:
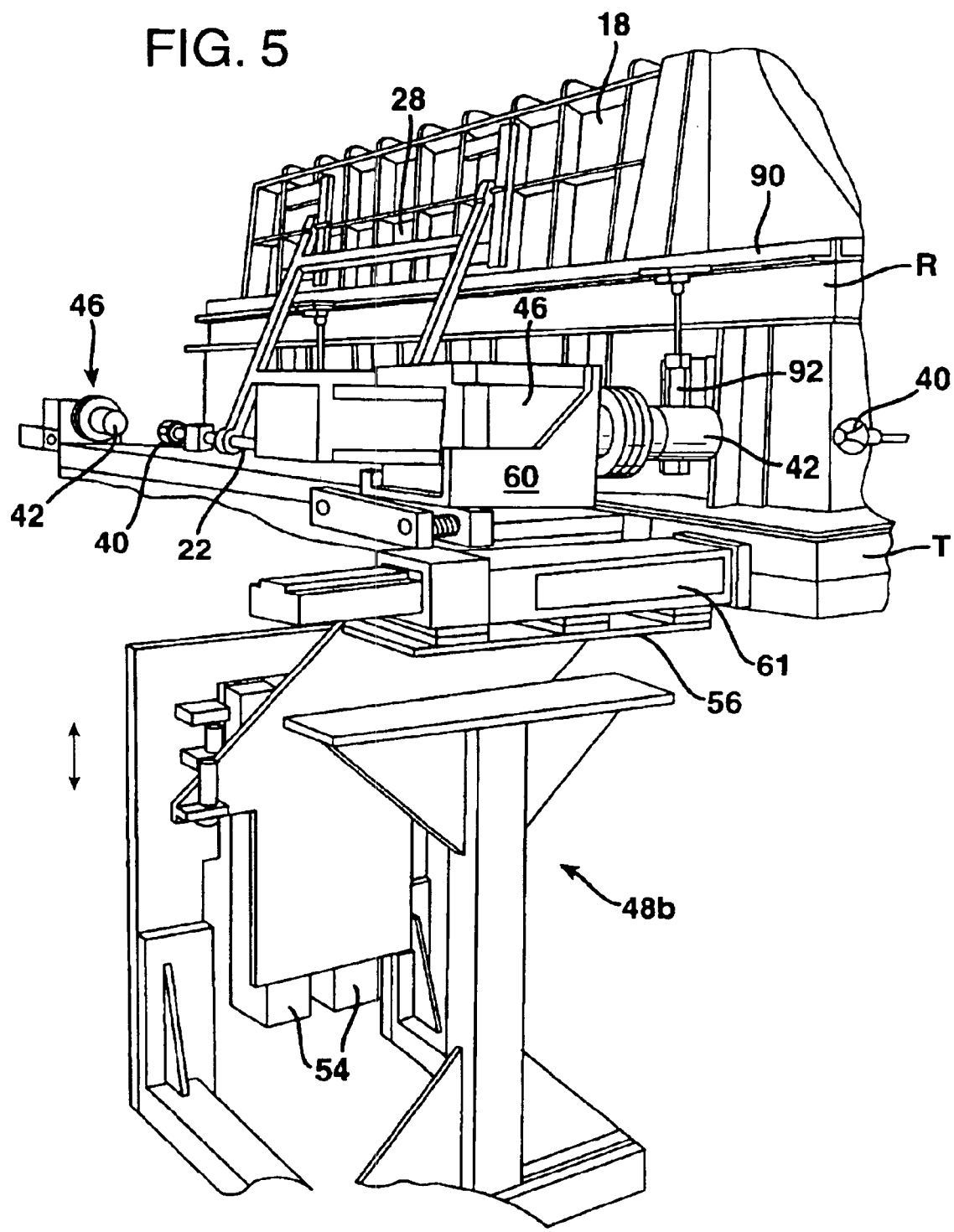
FIG. 5 is a side perspective view of a second motor stand assembly that moves the motor up and down in the vertical direction.
Figure 6:
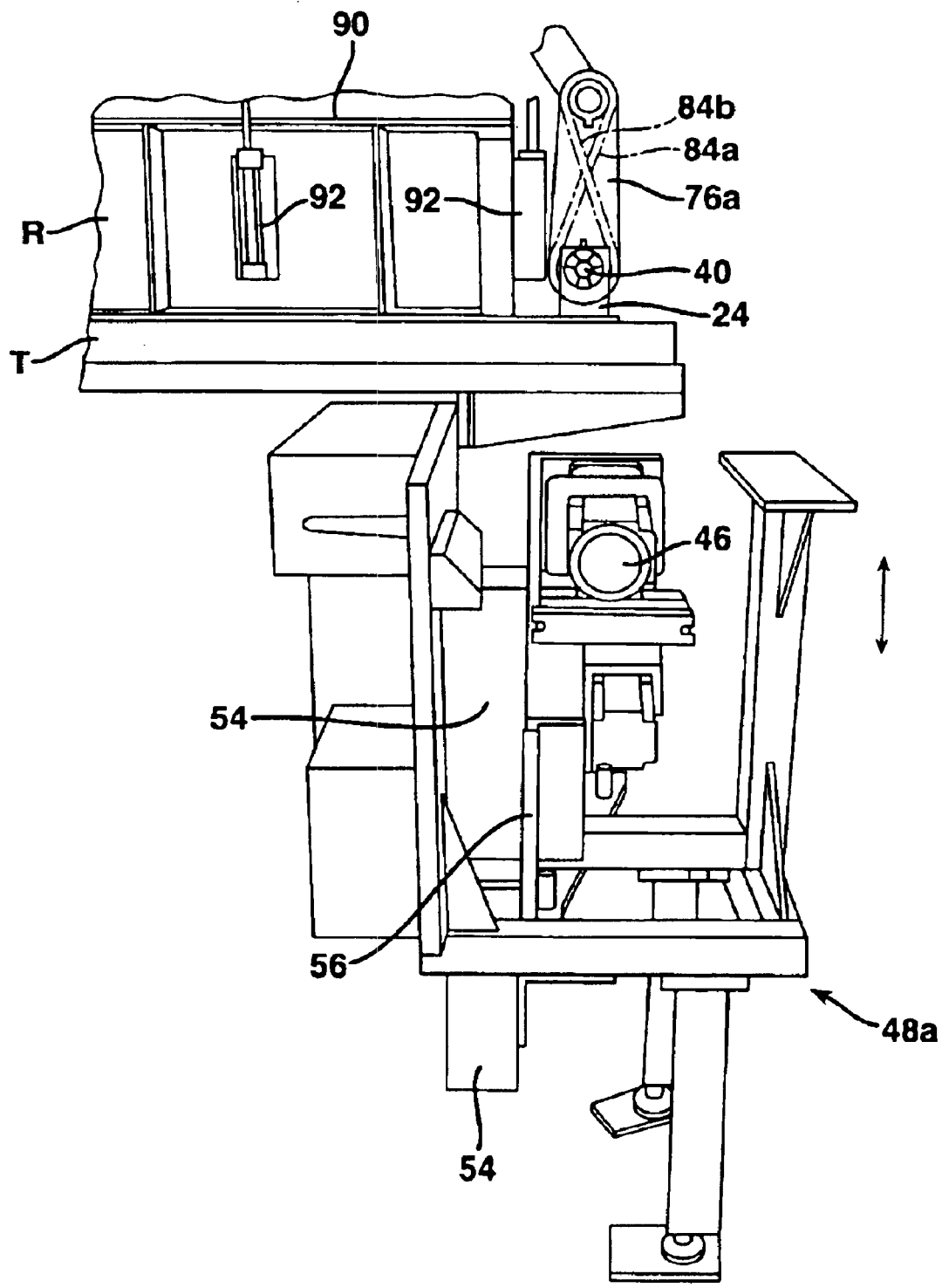
FIG. 6 is a side view showing in elevation a different side of the stand assembly of FIG. 5.
Figure 6A:
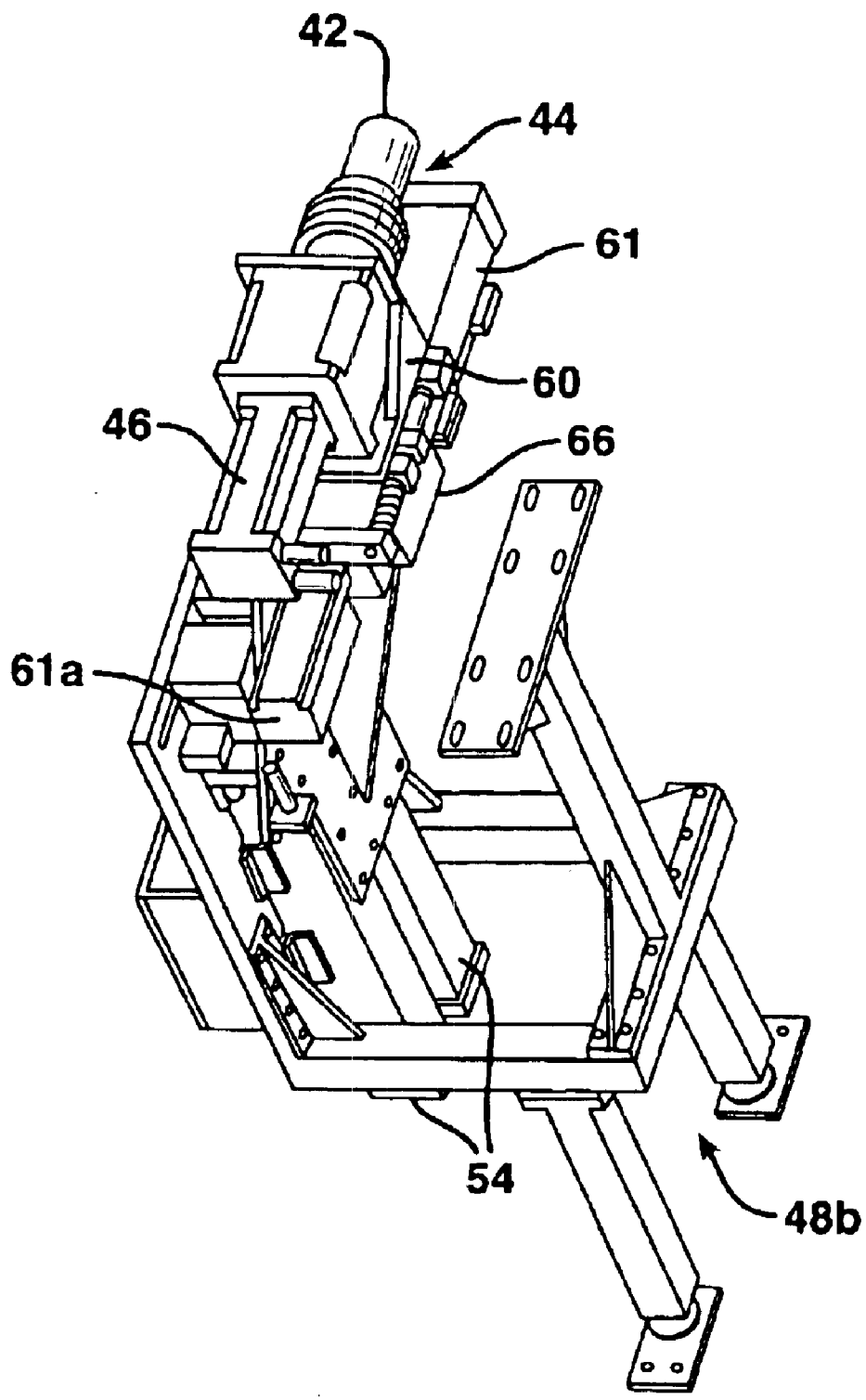
FIGS. 6a–6c show various views of the stand assembly of FIGS. 5 and 6.
Figure 6C:
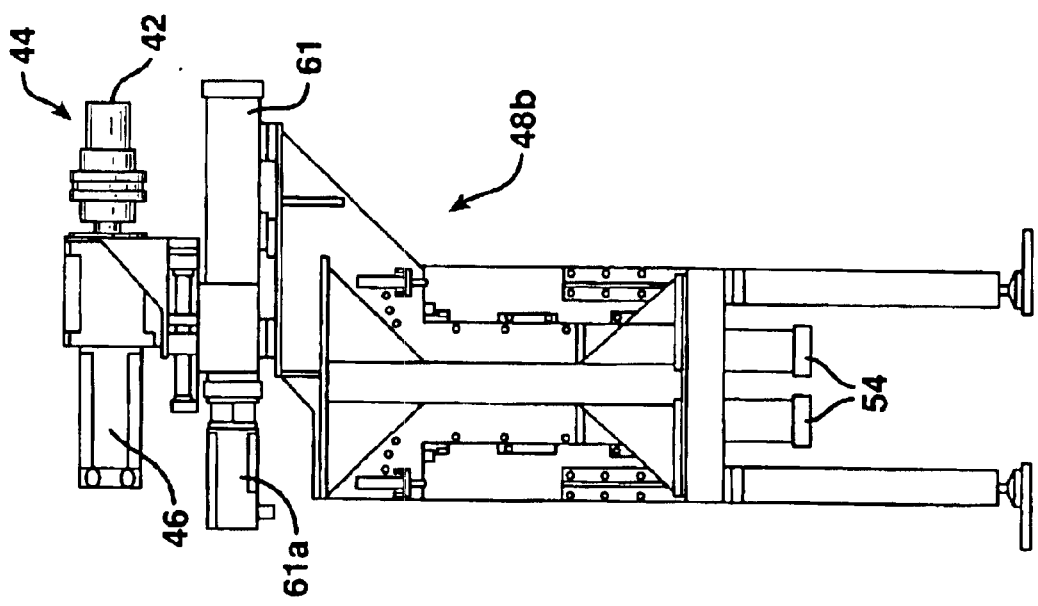
Figure 6B:
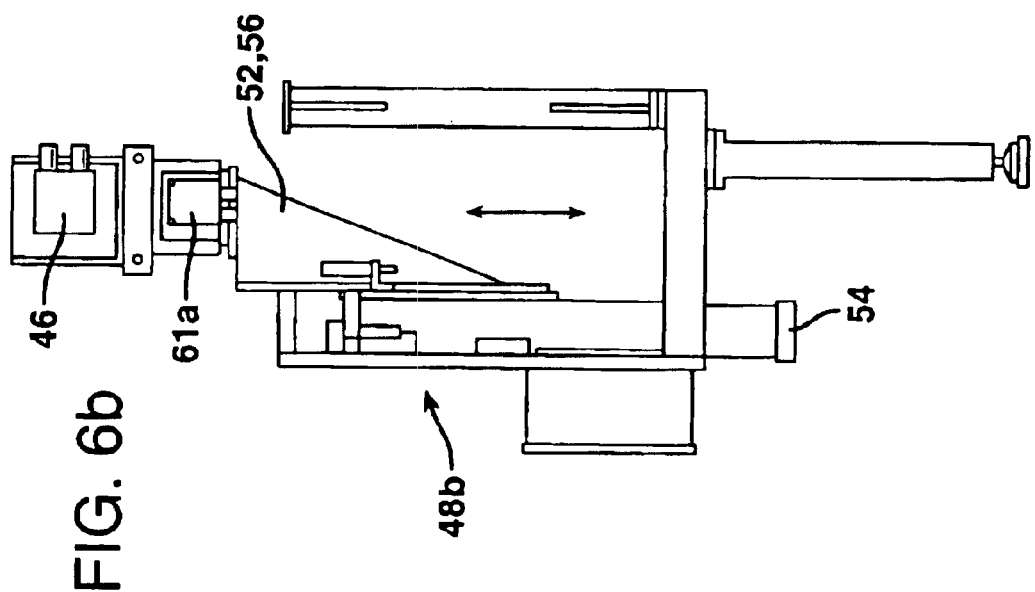

Once the compaction screen 18 or holding device is rotated into the proper position, and after the preform or other molded article is subjected to the curing process using the overhead oven or the like, the motors 46 at the removal or recovery station are used in a similar fashion to rotate the shaft 22 of the second motive device 20b in the opposite direction (in a counterclockwise direction in the side view of FIG. 4e). This moves both subframe 76a, 76b of the support assembly 26 and hence the screen 18 away from the corresponding side of the mold 12. As should be appreciated, this movement causes the chains 84a, 84b on each side to engage and release from the sprockets 82, respectively, and pivot the second support subframe 76b relative to the first support subframe 76a and away from the mold 12. As should now be appreciated, this pivoting motion allows for the screen 18 to be moved into position where there are obstacles that might prevent the use of the fixed frame arrangement described above.

In moving either motive device 20a or 20b, it should also be appreciated that the springs 34 are wound so as to create a torsion force that urges each shaft 22 to a position where the compaction screen 18 or holding device is adjacent to the corresponding side of the mold 12. This torsional force assists in ensuring that the screen 18 and other portions of the motive device 20a or 20b remain in the desired position adjacent to the mold 12, even after the rotation of the motor 46 is stopped and it is disengaged, such as when the trolley T is moving between the spray, curing, and removal stations. The torsional force supplied by each spring 34 also assists in ensuring that the motion of the corresponding support assembly 26 in retracting is smooth, since it operates as an assist when the shaft 22 is rotated in a one direction, as well as a sort of shock absorber as the corresponding shaft is rotated in the opposite direction.

In addition to engaging the planar side surfaces 12 using the compaction screens 18, it is also desirable to cover the lower edge extending along each side of the mold 12 to prevent the composition C used as the molding material to form the preform or article from falling out or escaping once the vacuum is removed. To do so, and as perhaps best shown in FIG. 8, elongated shoulder rails 90 may are provided. The shoulder rails 90, which are preferably flat or L-shaped and have perforated surfaces, are moved into position after the corresponding compaction screen 18 is in place, and preferably all four shoulder rails are simultaneously moved into place at the same time. Actuation may be provided by a plurality of motive devices in the form of spaced, vertically extending pneumatic cylinders 92. Preferably, the cylinders 92 are arranged in pairs or batteries and mounted on each side of the riser R just below the mold 12 such that a piston extending from each cylinder may be connected directly to the shoulder rail 90.

To allow for the selective pneumatic actuation of the cylinders 92 at each of the spray and removal stations, and without subjecting the pneumatic lines or other components to the heat of the oven, a valve block 94 is mounted adjacent to one side of the mold 12, preferably on the trolley T (and even possibly supported adjacent to or by a portion of the motive device 20b, as shown in FIGS. 4a and 4b). The valve block 94 includes a plurality of quick release, automatically locking valves 94a–d (see FIG. 4a) corresponding to and in fluid communication with feed lines 95 (see FIG. 9) corresponding to each battery of pneumatic cylinders 92 for engaging the shoulder rail 90 along a side of the mold 12. The valves 94a–d are adapted to mate with corresponding female supply heads 96a–d on a laterally translating pneumatic supply assembly 96 that moves to and fro relative to the trolley T. As shown in FIGS. 9a, 9b, 9c, and 9d, the supply assembly 96 includes a bracket subassembly 97 for supporting the supply heads 96a–d. The bracket subassembly 97 is mounted on a pair of slide members 98. The extension end 100a of a thruster cylinder 100 is coupled to the bracket subassembly 97 and serves to move the supply heads 96a–d toward and away from the corresponding valves 94a–d in the adjacent valve block 94 when activated or deactivated. The face of the supply assembly 96 also includes at least one, and preferably a pair of male alignment members 104a, 104b having conical heads that are received in corresponding receivers (not shown) in the valve block 94 to ensure that proper alignment between the valves 94a–d and the supply heads 96a–96b is achieved. The thruster 100 may be supported on a bracket 105 that may be mounted in a stationary fashion to one of the motor support stands 48a, 48b, or could possibly be supported by a separate stand (not shown). Pneumatic lines (not shown) are coupled with the supply heads 96a–d and for actuating the thruster 100.

Figure 10A:
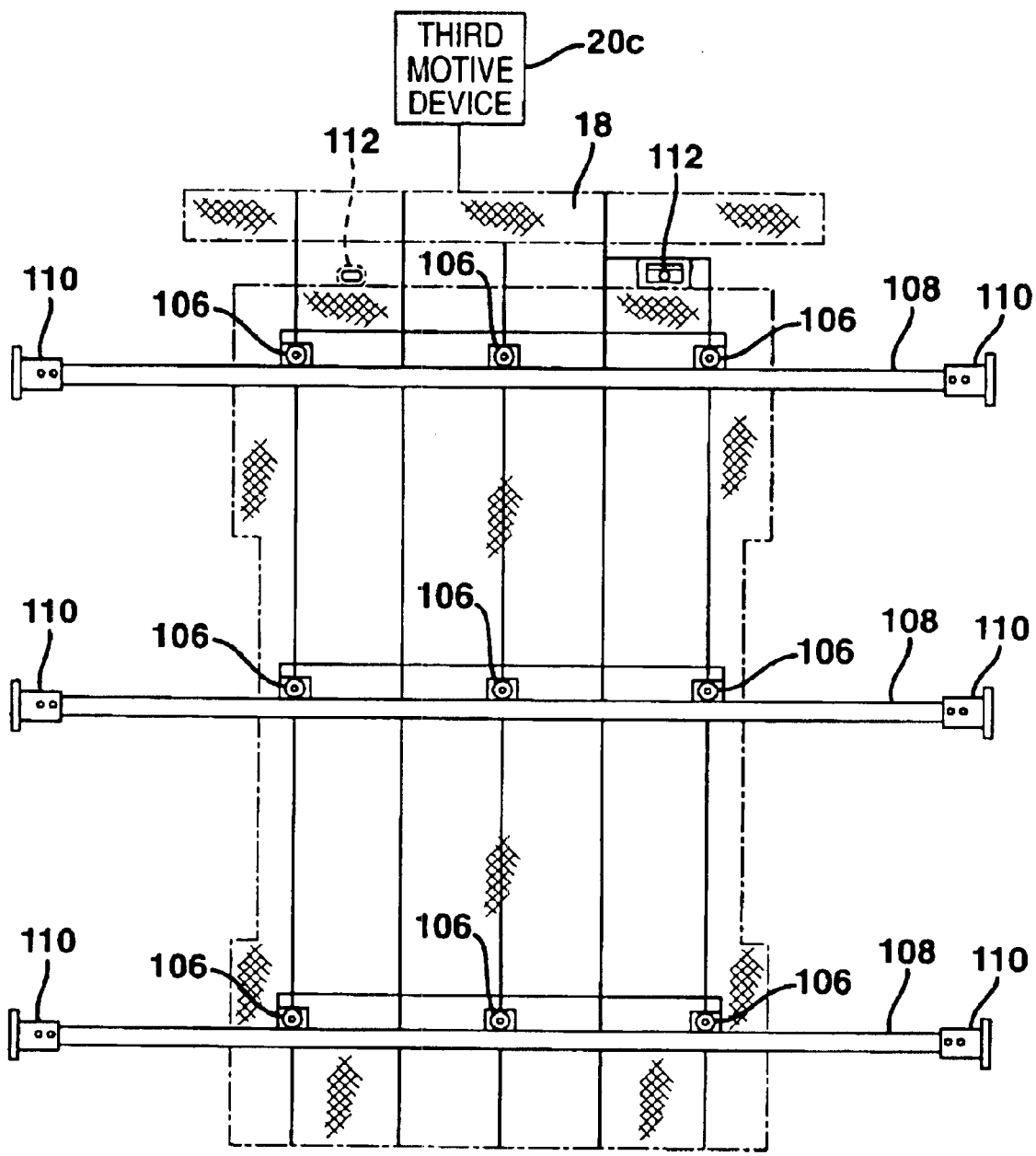
FIG. 10a is a top plan view of an assembly including a top compaction screen which may be carried by an oven used in the curing process.
Figure 10B:
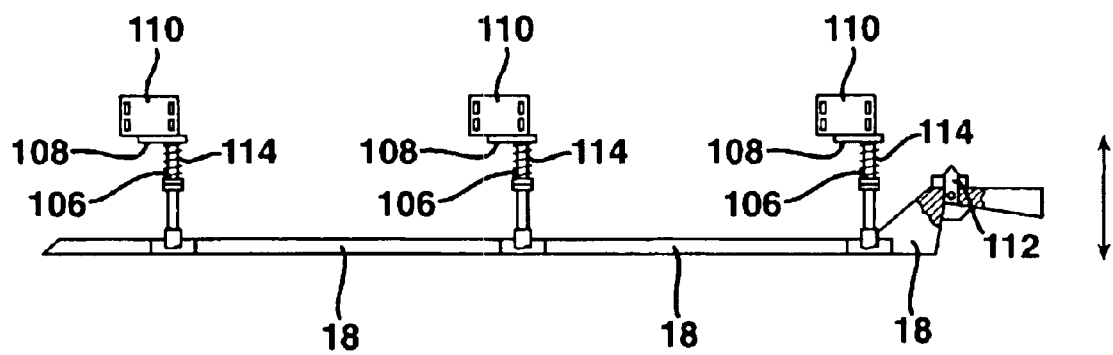
FIG. 10b is a side elevational view of the top compaction screen of FIG. 10a, including the compression assemblies.
Figure 11D:
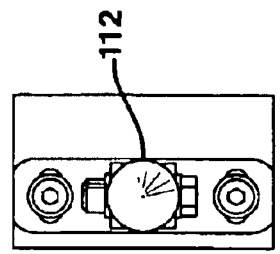
FIGS. 11b–11d are various enlarged views of the alignment pin for the top compaction screen.
Figure 11C:
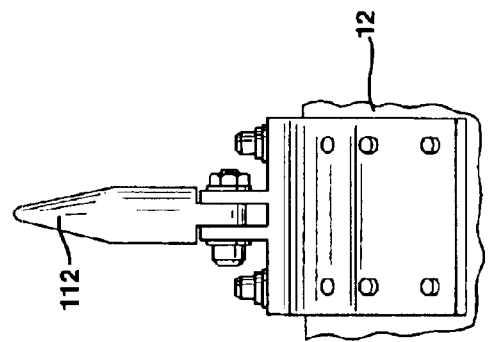
Figure 11B:
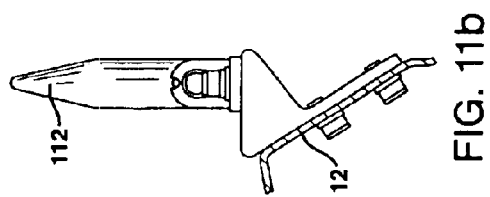

With reference now to FIGS. 10a and 10b, a screen 18 is also provided for covering the top of the mold 12 to assist in compacting the composition C serving as the molding material for forming the preform or molded article. The third motive device 20c for moving this top screen 18 from between the first and second positions is the overhead oven, represented schematically as device 20c in FIG. 10a. The top screen 18 is suspended from a plurality of compression assemblies 106 that are each attached to one of a plurality of elongated cross members or supports 108. The opposing ends of the cross members 108 include mounting brackets 110 that are attached at various points along the inside surfaces of the overhead oven (not shown) that is brought down over the mold 12 at the curing station when all the side screens 18 and the shoulder rails 90 are in place (with the brackets at one end of each support 108 having slots for receiving fasteners (not shown) that are loosely mounted to allow for thermal expansion or contraction as a result of the heat of the adjacent oven surfaces). Vertically extending alignment pins 112 are provided at strategic locations on the mold 12 to engage in apertures or bores formed in the top screen 18; see FIGS. 11b, 11c, and 11d. When registered, these pins 112 ensure that proper alignment is achieved when the top screen 18 is lowered into place with the oven.

Figure 11A:
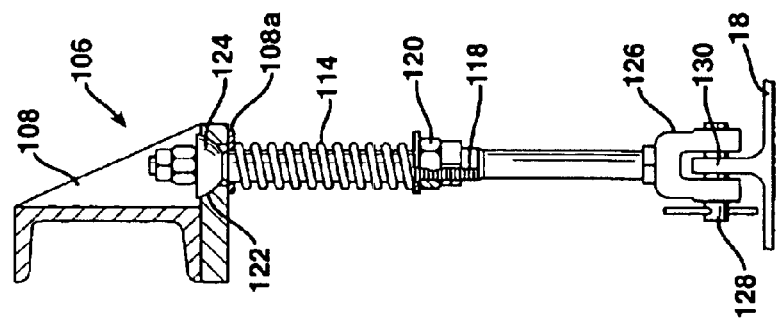
FIG. 11a is an enlarged side elevational view of a single compression assembly.

As shown in FIG. 11a, each compression assembly 106 includes a compression spring 114 that engages a washer 116 held in place on a partially threaded shaft 118 by a nut 120 at one end and the lower surface of the support 108 and/or a washer 108a at the opposite end. The support 108 includes an aperture 122 corresponding to each compression assembly 106 for receiving the upper end of the shaft 118. Each aperture 122 is contoured for receiving the lower surface of a nut threaded or captured on the upper extent of the shaft 118, such as a hemispherical swivel nut 124. The opposite end of the shaft 118 carries a clevis 126 that receives a transversely extending, removable connector 128 held in an bracket 130 projecting upwardly from the top screen 18. Hence, when the oven is lowered and engagement between the lower surface of the top screen 18 and the upper surface of the mold 12 is established, the continued lowering of the oven causes the lower surface of the support 108 to move into engagement with and compress the springs 114. These springs 114 in turn continue to press against the top screen 18 against the upper portion of the mold 12 as the lowering operation is continued.

As should be appreciated, the entire system S may essentially be driven using pneumatic power, in which case a pneumatic circuit is provided. It should also be appreciated that the supply of air to and the resulting operation of the various motive devices may be computer controlled.

Obvious modifications and adjustments can be made to the system of the present invention without departing from the broadest aspects of the present invention. For instance, all four of the screens 18 along the lateral or vertically extending sides of the mold 12 may each be supported by the same types of motive devices, whether motive devices 20a or 20b. Alternatively, three screens 18 may be supported by one type and the fourth by the other, etc. The only requirement is that the motive device used must be capable of moving the screen 18 toward and away from the mold 12 without interfering with any adjacent structures, such as the riser walls or the shoulder rails 90. Also, instead of using a pivoting frame, it may be possible to use a fixed frame having a bend to position the screen 18 against the mold 12 without interfering with any adjacent structures.

The foregoing description of various embodiments of the present invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

In the claims:

1. In a system for forming a molded article from a composition comprised of a plurality of chopped mineral fibers and a binder applied to at least one portion of a perforated mold and initially held in place by a vacuum drawn through the perforations before undergoing a curing process, an automated assist apparatus, comprising:
   at least one holding device for holding the composition applied to the at least one portion of the perforated mold in place both prior to and during the curing process;
   a motive device for automatically moving the holding device from a first retracted position sway from the mold to a second position far holding the composition in place; wherein the motive device includes a first rotatable shaft journaled in a plurality of supports; a support assembly having a first end for supporting the holding device and a second end coupled to the rotatable shaft; and a first motor for selectively engaging and rotating the shaft to move the support assembly and hence the holding device between the first and second positions;
   wherein the vacuum is released when the holding device is in the second position, the composition is subjected to the curing process, and the holding device is automatically moved to the first refracted position for removing the cured molded article from the mold.

2. The automated assist apparatus for a system tin forming a molded article of claim 1, wherein the holding device includes at least one perforated screen that in addition to holding the composition in place, also serves to at least moderately compact the composition on the corresponding portion of the mold.

3. The automated assist apparatus for a system for forming a molded article of claim 2, wherein the balding device comprises a single compaction screen having a surface area corresponding to the surface area of the portion of the mold.

4. The automated assist apparatus for a system for forming a molded article of claim 1, wherein the support assembly comprises a fixed frame having a pair of upper legs, each carrying a bracket for supporting the holding device, and a pair of lower legs having apertures that receive the first rotatable shaft.

5. The automated assist apparatus for a system for forming a molded article of claim 1, wherein the support assembly includes a pivoting frame including a first subframe forming the first end and a second subframe forming the second end, wherein the first and second subframes are coupled together by a second rotatable shaft such that the second subframe is capable of pivoting relative to the first subframe while the entire support assembly is moved between the first and second positions as a result of the rotation of the first rotatable shaft.

6. The automated assist apparatus for a system for forming a molded article of claim 1, wherein the first motor has a receiver for coupling with a corresponding coupler on the first rotatable shaft, and further including a mounting assembly comprising an actuator for moving the motor and hence the receiver toward and away from the corresponding coupler on the first rotatable shaft.

7. The automated assist apparatus for a system for forming a molded article of claim 6, further including a support stand assembly for supporting the first motor wherein the support stand assembly is capable of moving the first motor between a first retracted position and a second position such that the receiver is in axial alignment with the coupler on the shaft.

8. The automated assist apparatus for a system for forming a molded article of claim 7, wherein the support stand assembly is capable of pivoting the first motor between the first and second positions.

9. The automated assist apparatus for a system for forming a molded article of claim 7, wherein the support stand assembly is capable of raising and lowering the first motor between the first and second positions.

10. The automated assist apparatus for a system for forming a molded article of claim 6, wherein the actuator is a linear actuator.

11. The automated assist apparatus for a system for forming a molded article of claim 1, wherein the mold includes a plurality of side portions, and the apparatus further comprises a separate holding device for holding the composition applied to each side portion of the perforated mold in place and a motive device for automatically moving each separate holding device from a first refracted position to a second position for holding the composition in place.

12. The automated assist apparatus for a system for Conning a molded article of claim 1, wherein the mold includes a top portion that together with a plurality of lateral portions defines a box shape for creating a liner having plurality of sidewalls and a base, and wherein the holding device for the top portion is a compaction screen carried in a motive device in the form of an overhead oven that is lowered over the mold to cure the composition and form the molded article.

13. The automated assist apparatus for a system for forming a molded article of claim 1, wherein the motive device includes a first motor for moving the holding device from the first position to the second position at a spray station where the composition is applied and a second motor for moving the holding device from the second position to the first position at a removal or recovery station after curing is complete.

14. The automated assist apparatus for a system for forming a molded article of claim 13, further including a plurality of holding devices and a plurality of the first and second motors corresponding to each of a plurality of sides of the mold at both the spray and removal/recovery stations.

15. The automated assist apparatus for a system for forming a molded article of claim 1, wherein the side of the mold extends in a vertical direction, and the holding device includes a compaction screen for covering the vertically extending side of the mold and a shoulder rail fur covering a lower side edge of the composition between the compaction screen and the adjacent side of the mold, and a second motive device serves to move the shoulder rail between a first retracted position and a second position adjacent to the mold both before and after curing is complete.

16. The automated assist apparatus for a system for Conning a molded article of claim 15, wherein the second motive device includes at least one pneumatic cylinder for moving the shoulder rail and the apparatus further includes a pneumatic supply apparatus mounted on a laterally translating base for moving to and fro into engagement with a valve block having at least one valve in fluid communication with the pneumatic cylinder, wherein the pneumatic supply apparatus may be retracted before curing and actuated after curing is complete.

17. A system for forming a molded article from a composition comprised of a plurality of chopped mineral fibers and a binder, comprising:
a perforated mold having at least one side portion for receiving the composition;
a vacuum source for drawing a vacuum through the perforations in the base;
at least one holding device for holding the composition applied to the side portion of the perforated mold in place;
at least one first motive device for automatically moving the holding device from a first refracted position away from the mold to a second position for holding the composition in place;
a trolley for supporting the mold and moving the mold between a first station where the composition is applied and a second station where the composition is cured;
wherein the vacuum is released when the holding device is in the second position and the composition is subjected to a curing process, and the holding device is automatically moved to the first refracted position for removing the cured molded article from the mold.

18. The system according to claim 17, wherein the first motive device comprises: a first rotatable shaft journaled in a plurality of supports; a support assembly having a first end for supporting the holding device and a second end coupled to the rotatable shaft; and a first motor for selectively engaging and rotating the shaft to move the support assembly and hence the holding device between the first and second positions.

19. The system according to claim 18, wherein the shaft and support assembly are supported on the trolley and the system further includes a stand assembly for supporting the first motor at the first station.

20. The system according to claim 19, wherein the trolley moves the mold to a third station fur removing the molded article after curing, and the motive device further includes a second motor at the third station for moving the holding device from the second position to the first retracted position.

21. The system according to claim 20, wherein the second motor is supported by a separate stand assembly.

22. An automated process for forming a molded article from a composition including a plurality of mineral fibers applied to at least one side of a perforated mold supported on a stable support structure and held in place by a vacuum drawn through the perforations, comprising:
automatically positioning a holding device over the composition applied on the at least one side portion of the mold,
automatically moving the holding device from a first retracted position away from the mold to a second position for holding the composition in place using a motive device; wherein the motive device includes a first rotatable shaft journaled in a plurality of supports; a support assembly having a first end for supporting the holding device and a second end coupled to the rotatable shaft; and a first motor for selectively engaging and rotating the shaft to move the support assembly and hence the holding device between the first and second positions;
whereby the composition is held in place on the mold in the substantial absence of the vacuum without the need for manual intervention by a worker.

23. The process according to claim 22, wherein the holding device is a compaction screen, and the automatic positioning step include; actuating a motive device to move the compaction screen from a first position away from the mold to a second position wherein the composition is held between the compaction screen and the mold.

24. The process according to claim 22, wherein the composition further comprises a binder, and the process further includes subjecting the composition on the mold to a curing process to create the molded article.

25. The process according to claim 22, further including the step of retracting the holding device once the curing process is complete to allow for recovery of the molded article.

26. An automated process for forming a molded article, such as a preform, comprising:
applying a vacuum to a perforated mold having at least one side portion;
applying a composition including a plurality of chopped mineral fibers and a binder to at least the side portion of the mold;
automatically positioning a holding device adjacent to the side portion of the mold to hold the composition in place when the vacuum is removed;
curing the composition to form the molded article;
automatically removing the holding device from adjacent the side portion of the mold after the curing step using a motive device; wherein the motive device includes a first rotatable shaft journaled in a plurality of supports; a support assembly having a first end for supporting the holding device and a second end coupled to the rotatable shaft; and a first motor for selectively engaging and rotating the shaft to move the support assembly and hence the holding device between the first and second positions.

27. The method according to claim 26, further including removing the molded article after the holding device is automatically removed.

* * * * *

UNITED STATES PATENT AND TRADEMARK OFFICE
CERTIFICATE OF CORRECTION

PATENT NO. : 6,713,012 B2
DATED : March 30, 2004
INVENTOR(S) : Galloway

It is certified that error appears in the above-identified patent and that said Letters Patent is hereby corrected as shown below:

Title page,
Item [75], Inventor, "James W. Montjoy" should have the suffix -- Jr. -- after his name.

Column 13,
Line 45, "sway" should read -- away --
Line 46, "far" should read -- for --
Line 60, "tin" should read -- for --
Line 67, "balding" should read -- holding --

Column 14,
Line 52, "Conning" should read -- forming --

Column 15,
Line 10, "fur" should read -- for --
Line 17, "Conning" should read -- forming --
Line 47, "refracted" should read -- retracted --
Line 62, "fur" should read -- for --

Column 16,
Line 28, "include;" should read -- includes --

Signed and Sealed this

Thirteenth Day of July, 2004

JON W. DUDAS
*Acting Director of the United States Patent and Trademark Office*